United States Patent
Chappell

(10) Patent No.: US 6,425,132 B1
(45) Date of Patent: Jul. 23, 2002

(54) INGRESS TESTING OF CATV SYSTEM UTILIZING REMOTE SELECTION OF CATV NODE

(75) Inventor: Daniel K. Chappell, Fishers, IN (US)

(73) Assignee: Wavetek Corporation

( * ) Notice: Subject to any disclaimer, the term of this patent is extended or adjusted under 35 U.S.C. 154(b) by 0 days.

(21) Appl. No.: 09/055,664

(22) Filed: Apr. 6, 1998

(51) Int. Cl.$^7$ ............................................... H04N 7/173
(52) U.S. Cl. ..................... 725/107; 725/106; 725/124; 725/125; 348/180; 348/192; 348/193; 324/500; 324/512; 324/522; 324/528; 324/750; 324/731; 379/1; 379/2; 379/6; 379/12; 379/19; 379/26; 379/27; 379/34; 455/67.1; 455/67.3; 455/67.4
(58) Field of Search ........................ 725/107, 124–125, 725/106; 348/180, 192–193; 324/500, 512, 522, 528, 531–535, 750; 455/67.1, 67.3, 67.4; 379/1–2, 6, 12, 19, 26–27, 34

(56) References Cited

U.S. PATENT DOCUMENTS

| 3,750,022 A | | 7/1973 | Curry et al. |
|---|---|---|---|
| 3,924,187 A | | 12/1975 | Domans |
| 4,029,913 A | * | 6/1977 | Gunderson ............... 179/175.3 |
| 4,365,249 A | | 12/1982 | Tabata |
| 4,520,508 A | | 5/1985 | Reichert, Jr. |
| 4,810,898 A | | 3/1989 | Rocci et al. |
| 5,260,648 A | | 11/1993 | Brust |
| 5,585,842 A | | 12/1996 | Chappell et al. |
| 5,631,846 A | | 5/1997 | Szurkowski |
| 5,867,206 A | * | 2/1999 | Voght et al. .................... 348/6 |
| 5,881,363 A | * | 3/1999 | Ghosh et al. ................. 455/5.1 |
| 6,002,671 A | * | 12/1999 | Kahkoska et al. .......... 370/248 |
| 6,044,090 A | * | 3/2000 | Grau et al. ................. 370/485 |

* cited by examiner

Primary Examiner—Andrew Faile
Assistant Examiner—Son P. Huynh
(74) Attorney, Agent, or Firm—Maginot, Moore & Bowman

(57) ABSTRACT

A CATV system in which a technician in the field requests via a field client that a node of the CATV system be tested for ingress. The CATV system includes a headend facility that is coupled to a CATV distribution network. The CATV distribution network includes a plurality of nodes through which upstream signals are transmitted to the headend facility. A method of ingress testing for use in the CATV system includes one step of receiving at the headend facility a first reverse telemetry signal transmitted by a first field client that is coupled to the CATV distribution network at a first location downstream from the headend facility. Another step of the method includes selecting at the headend facility a first test node from the plurality of nodes of the CATV distribution network, wherein the selection is based upon the received first reverse telemetry signal. The method also includes the step of measuring first upstream signals from the selected first test node to obtain a first plurality of measurement values for the first upstream signals. Finally, the method includes transmitting from the headend facility via the CATV distribution network a forward telemetry signal that includes the first plurality of measurement values.

36 Claims, 14 Drawing Sheets

INGRESS TESTING OF CATV SYSTEM UTILIZING REMOTE SELECTION OF CATV NODE

FIELD OF INVENTION

The present invention relates generally to two-way or bidirectional cable television systems and, and more particularly to method and apparatus of ingress testing a two-way CATV system which provides for remote selection of nodes to be tested and remote viewing of ingress test measurements obtained from the selected node.

BACKGROUND OF THE INVENTION

Community Antenna Television ("CATV") systems are used in a widespread manner for the transmission and distribution of television signals to end users, or subscribers. In general, CATV systems comprise a headend facility and a distribution network. The headend facility obtains television signals associated with a plurality of CATV channels and generates a broadband CATV signal therefrom. The distribution network then delivers the CATV broadband signal to television receivers located within the residences and business establishments of subscribers.

Two-way CATV networks have been touted as a promising method of providing communications in cable television systems. Accordingly, two-way networks were widely specified in CATV service provider franchise agreements over the last twenty years. Technical problems, however, have inhibited wide deployment of such two-way networks. In particular, interference due to ingress signals has greatly affected the quality of return path communications in two-way networks. Return path communications are communications from the subscribers to the headend facility.

Ingress signals comprise noise signals that are generated by sources external to the CATV network and are radiated onto the CATV network through cable faults, terminations, and the like. Some sources of ingress include international short-wave broadcasts; citizens band and ham radio transmissions; television receivers; computers; neon signs, electrical motors, hair dryers, garbage disposals, and other household appliances, and it has been estimated that 95% of ingress signal power originates in subscribers' homes.

Ingress signals are particularly troublesome in the context of return path communications because of the CATV two-way network architecture. In a CATV network, a large number of subscriber generated signals are funneled toward the headend. The ingress signal power on each of the subscriber generated signals is therefore combined and amplified, resulting in a relatively high ingress signal power at the headend facility.

Since consumer demand is currently high for various two-way services such as broadband internet access, interactive TV, and telephony, CATV franchises are interested in providing these services to their subscribers. However, in order to provide these services in a reliable manner, CATV franchises must eliminate or reduce ingress signals that interfere with two-way communications. In this regard, CATV franchises have implemented their CATV networks using more of a star topography with multiple nodes that each have a separate reverse path instead of the simpler tree topography. Each node of the CATV network, services only a portion of all of the subscribers instead of all the subscribers being serviced by a single node. The star topography inherently lowers the level of the ingress signal at the headend facility because each ingress signal includes a fewer number of ingress sources (e.g. subscribers). Furthermore, the star topography helps technicians determine the origination of the ingress signals because the technician may determine that ingress is originating in a certain node of the CATV network, thus eliminating subscribers of other nodes as the source of ingress. For example, in a 20,000 subscriber network where each node services 2,000 subscribers, if the technician can determine that ingress is concentrated in a single node of the network, then the technician may focus on the 2,000 subscribers serviced by that node, thereby eliminating 18,000 subscribers from consideration.

Even with a star topography, troubleshooting ingress can be a real challenge since ingress can be transient or constant, intermittent or predictably repetitive. Moreover, ingress signals may result from signal entry on one node or multiple points on one node, and may be broadband or narrow band in nature. Furthermore, ingress on one node may effect other nodes. Because of these characteristics, technicians must be able to make adjustments to a node of the CATV network and easily determine in the field whether the adjustments have remedied the problem. In particular, technicians need to be able determine in the field what effect the adjustments had on the upstream signals of the adjusted node, other nodes, and on the CATV system as a whole.

Reverse spectrum measurements of upstream signals as received by the headend facility are helpful in gaining insight into the ingress situation of the CATV network. However, as of yet there has been no automated way for a technician in the field to selectively obtain reverse spectrum measurements for different nodes of the CATV network. Accordingly, there is a need for a field client which may provide the technician in the field with reverse spectrum measurements of a certain node of the CATV network. Furthermore, there is a need for a headend facility that can receive a request to obtain reverse spectrum measurements for a node of the CATV network, obtain reverse spectrum measurements for the requested node, and provide the field client with the obtained reverse spectrum measurements.

SUMMARY OF THE INVENTION

The present invention fulfills the above needs, as well as others, by providing a CATV system which (i) allows a technician in the field to request via a field client that a node of the CATV system be tested for ingress, and (ii) allows the technician to view the results of the tested node. An exemplary method according to the present invention is a method of testing a CATV system having a headend facility that is coupled to a CATV distribution network that includes a plurality of nodes through which upstream signals are transmitted to the headend facility. One step of the method includes receiving at the headend facility a first reverse telemetry signal transmitted by a first field client that is coupled to the CATV distribution network at a first location. Another step of the method includes selecting at the headend facility a first test node from the plurality of nodes of the CATV distribution network, wherein the selection is based upon the received first reverse telemetry signal. The method also includes the step of measuring first upstream signals from the selected first test node to obtain a first plurality of measurement values for the first upstream signals. Finally, the method includes transmitting from the headend facility via the CATV distribution network a forward telemetry signal that includes the first plurality of measurement values.

The present invention further includes various apparatus for carrying out the above method. For example, one apparatus according to the present invention includes a CATV distribution network, a test point switch, an RF receiver, an RF transmitter, and a controller. The CATV distribution network includes a plurality of nodes through which upstream signals are transmitted. The test point switch is coupled to the plurality of nodes and is operable to electrically couple a first test node of the plurality of nodes to the RF receiver in response to a first control signal that is indicative of a first node identifier being applied to a node selection input of the test point switch. The first field client is coupled to the CATV distribution network at a first location, and is operable to transmit a first reverse telemetry signal that includes the first node identifier that identifies the first test node of the plurality of nodes.

The RF receiver is coupled to said test point switch and is operable to receive from said test point switch, a reverse RF signal that includes said first reverse telemetry signal. The RF receiver is also operable to measure first upstream signals received from the first test node to obtain a first plurality of measurement values for the first upstream signals. The RF transmitter is coupled to the CATV distribution network and is operable to transmit to the first field client via the CATV distribution network, a forward telemetry signal that includes the first plurality of measurement values for the first upstream signals. The controller is coupled to said RF receiver, said RF transmitter, and said test point switch. Moreover, the controller is operable to (i) control operation of the RF receiver and the RF transmitter, and (ii) cause the test point switch to electrically couple the first test node to the RF receiver by applying the first control signal to the node selection input.

The above features and advantages, as well as others, will become more readily apparent to those of ordinary skill in the art by reference to the following detailed description and accompanying drawings.

DETAILED DESCRIPTION

Figure 1:
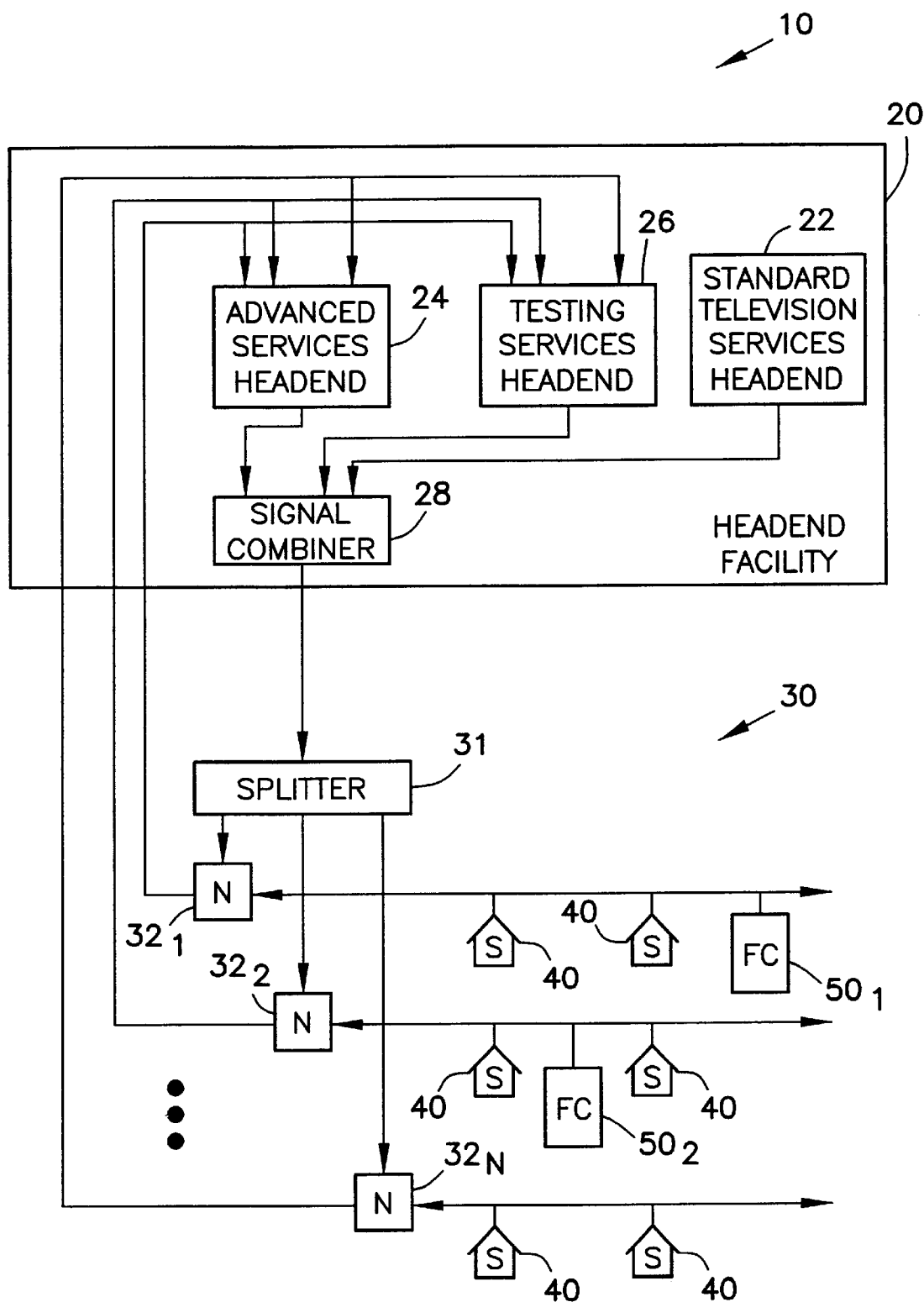
FIG. 1 shows a block diagram of a community antenna television system ("CATV") which incorporate features of the present invention.

Shown in FIG. 1 is a diagram of a CATV system 10 that incorporates various features of the present invention. The CATV system 10 includes a headend facility 20, a CATV distribution network 30, subscribers 40, and field clients $50_1$ and $50_2$. The CATV distribution network 30 generally provides a communications network for transferring RF signals both from the headend facility 20 to the subscribers 40 and from the subscribers 40 to the headend facility 20. In particular, the CATV distribution network 30 includes splitter 31 and nodes $32_1, 32_2 \ldots 32_N$ through which downstream signals to the subscribers 40 are transmitted from the headend facility 20. Furthermore, the CATV distribution network 30 may include various other elements such as optical transmitters, optical receivers, optical fibers, coaxial cable, bidirectional amplifiers, taps, and terminators which are not shown. It should be appreciated that the CATV distribution network 30 is merely exemplary and that the present invention may be practiced upon other network topographies which divide the network into sub-networks (i.e. nodes).

The headend facility 20 which is operably coupled to the CATV distribution network 30 includes a standard television services headend 22, an advanced services headend 24, a testing services headend 26, and a signal combiner 28. The standard television services headend 22 is coupled to the CATV distribution network 30 via the signal combiner 28. Moreover, as is well known in the art, the standard CATV services headend 22 receives a plurality of television signals, such as from satellite receivers (not shown) and antennas (not shown) located at the headend facility 20 and converts these television signals to appropriate frequencies for transmission over the CATV distribution network 30 to subscribers 40. In this regard, the standard CATV services headend 22 may be able to handle 78 channels. Each of the 78 channels having a unique carrier or channel frequency which in United States cable systems lies within the 5 MHz to 890 MHz frequency band. Moreover, in United States cable systems, the CATV channel frequencies are typically separated by 6 MHz or integer multiples thereof.

The advanced CATV services headend 24 is coupled to the CATV distribution network via the signal combiner 28 in order to transmit advanced CATV service signals to the subscribers 40. Moreover, the advanced CATV services headend 24 is coupled to the nodes $31_1, 31_2 \ldots 31_N$ in order to receive upstream signals from the subscribers 40. The advanced CATV services headend 24 is a device well known to those of ordinary skill in the art that provides several advanced control services such as telephony services, cable modem services, digital video services, and interactive TV services.

The testing services headend 26 is coupled to the CATV distribution network 30 via the signal combiner 28 in order to apply various testing signals to the CATV distribution network 30 and transmit forward telemetry messages to the field clients $50_1$ and $50_2$. Moreover, the testing services headend 26 is coupled to the nodes $31_1, 31_2 \ldots 31_N$ in order to receive upstream signals from the subscribers 40 and reverse telemetry messages from the field clients $50_1$ and $50_2$. In particular, the testing services headend 26 is operable to receive a reverse telemetry message from a field client $50_X$ which requests that a node $32_Y$ be tested for ingress, obtain reverse spectrum measurements from upstream signals received from the requested node $32_Y$, and transmit a forward telemetry message that includes the reverse spectrum measurements to the field client $50_X$.

Figure 2:
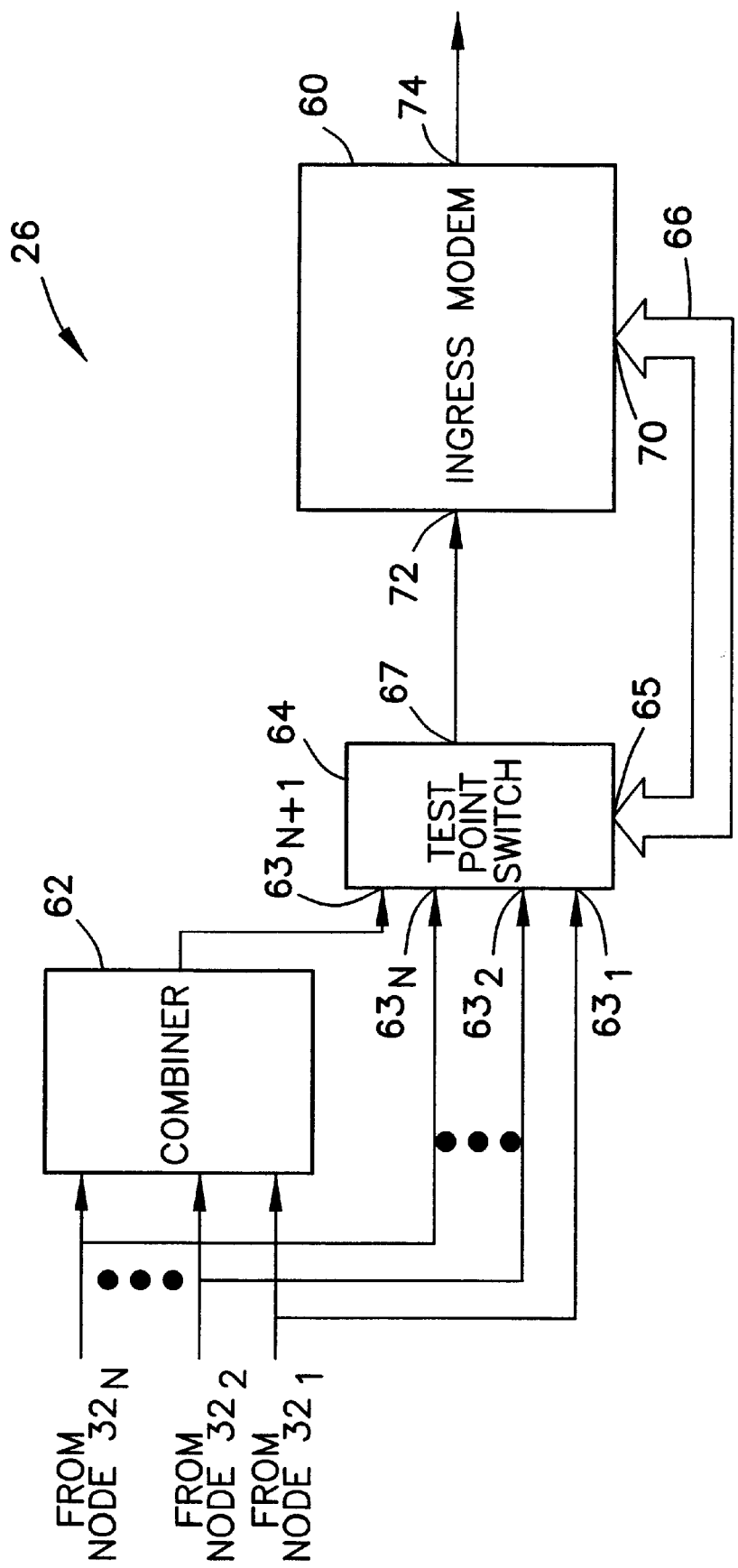
FIG. 2 shows in further detail the testing services headend of the CATV system of FIG. 1.

A block diagram of the testing services headend 26 is shown in FIG. 2. As depicted, the testing services headend 26 includes an ingress modem 60, a signal combiner 62, and a test point switch 64. The signal combiner 62 and the test point switch 64 are coupled to the nodes $32_1, 32_2 \ldots 32_N$ of the CATV distribution network in order to receive upstream signals. The signal combiner 62 is operable to receive upstream signals from the nodes $32_1, 32_2 \ldots 32_N$ and combine the upstream signals into a single composite upstream signal. The test point switch 64 includes a signal output 67, a plurality of signal inputs $63_1, 63_2 \ldots 63_N$ and a signal input $63_{N+1}$. The plurality of signal inputs $63_1, 63_2 \ldots 63_N$ are coupled to the nodes $32_1, 32_3 \ldots 32_N$ respectively in order to receive upstream signals from the nodes $32_1, 32_3 \ldots 32_N$. The signal input $63_{N+1}$ is coupled to the output of the signal combiner 62 in order to receive the single composite upstream signal of the combiner 62. The test point switch 64 also includes a node selection input 65 which is operable to receive a node identifier N_ID that identifies a node $32_Y$. The test point switch 64 operably couples the signal output 67 to the signal input $63_Y$ which corresponds to the node $32_Y$ identified by the received node identifier N_ID. The test point switch 67 in the preferred embodiment is implemented with an Electroline TPS, available from Electroline Equipment, Inc. of Montreal, Canada.

The ingress modem 60 includes a communications port 70, an RF input jack 72, and an RF output jack 74. The RF input jack 72 is coupled to the signal output 67 of the test point switch 64, and the RF output jack 74 is coupled to the signal combiner 28 of FIG. 1. Furthermore, the communication port 70 is coupled to the node selection input 65 via a communications link 66. The communications link 66 in the exemplary embodiment is implemented with an RS-232 serial cable.

The ingress modem 60 is generally operable to receive upstream signals from nodes $32_1, 32_2 \ldots 32_N$ via the test point switch 64 and obtain reverse spectrum measurements from the receive upstream signals. Moreover, the ingress modem 60 is operable to process reverse telemetry messages that include requests to ingress test a specific node $32_Y$ and transmit a forward telemetry signal which contains reverse spectrum measurements obtained from the upstream signals received from the requested node $32_Y$.

In normal operation, the services of the headend facility 20 transmit RF signals downstream to the subscribers 40 via the CATV distribution network 30. The subscribers 40 receive the RF signals from the CATV distribution network 30 and process the RF signals accordingly. For example, a subscriber 40 may have a television receiver which displays television program information transmitted by a standard CATV services headend 22, or a computer equipped with a cable modem which displays a web page transmitted by a cable modem of the advanced services headend 24.

In addition, the subscribers 40 may transmit RF signals upstream to the headend facility 20 via the nodes $32_1, 32_2 \ldots 32_N$ of the CATV distribution network 30. The transmission path from the subscribers 40 to the headend facility 20 is referred to herein as the reverse path. Services of the advanced services headend 24 process the upstream RF signals in order to fulfill the request from the subscriber 40. For example, a subscriber 40 may transmit a video request for a particular video. The advanced services headend 26 in response to receiving the request may transmit the requested video to the subscriber 40.

To maintain performance of the CATV distribution network, it is desirable to perform ingress testing of the reverse path from time to time.

During ingress testing, a technician couples the field client $50_X$ to the CATV distribution network and enters into the field client $50_X$ a node identifier N_ID$_Y$ which identifies a node $32_Y$ to be ingress tested. The field client $50_X$ then transmits upstream to the headend facility 20 a reverse telemetry message that includes the node identifier N_ID$_Y$ for the node $32_Y$. The ingress modem 60 receives the reverse telemetry message via the composite upstream signal of the signal combiner 62 and the test point switch 64 which has already been configured to pass the composite upstream signal through to its signal output 67. The ingress modem 60 obtains the node identifier N_ID$_Y$ from the reverse telemetry message and transmits the node identifier N_ID$_Y$ via the communication link 66 to the node selection input 65 of the test point switch 64. The test point switch 64 in response to receiving the node identifier N_ID$_Y$ operably couples the corresponding signal input $63_Y$ to the signal output 67 thereby passing the upstream signal of the node $32_Y$ through to the signal output 67 and the ingress modem 60.

The ingress modem 60 then performs spectral analysis upon the received upstream signal by taking several signal level measurements of the upstream signal at different frequencies. After performing spectral analysis upon the received upstream signal, the ingress modem 60 transmits a forward telemetry message which includes the several signal level measurements to the field client $50_X$ via the CATV distribution network 30. The field client $50_X$ receives the forward telemetry message and extracts the signal level measurements therefrom. The field client $50_X$ then graphically displays the signal level measurements thereby enabling a technician to view the reverse spectrum of the requested node $32_Y$. The technician then may make determination from the graphical display of whether the headend facility 20 is receiving upstream ingress signals from the requested node $32_Y$.

Figure 3:
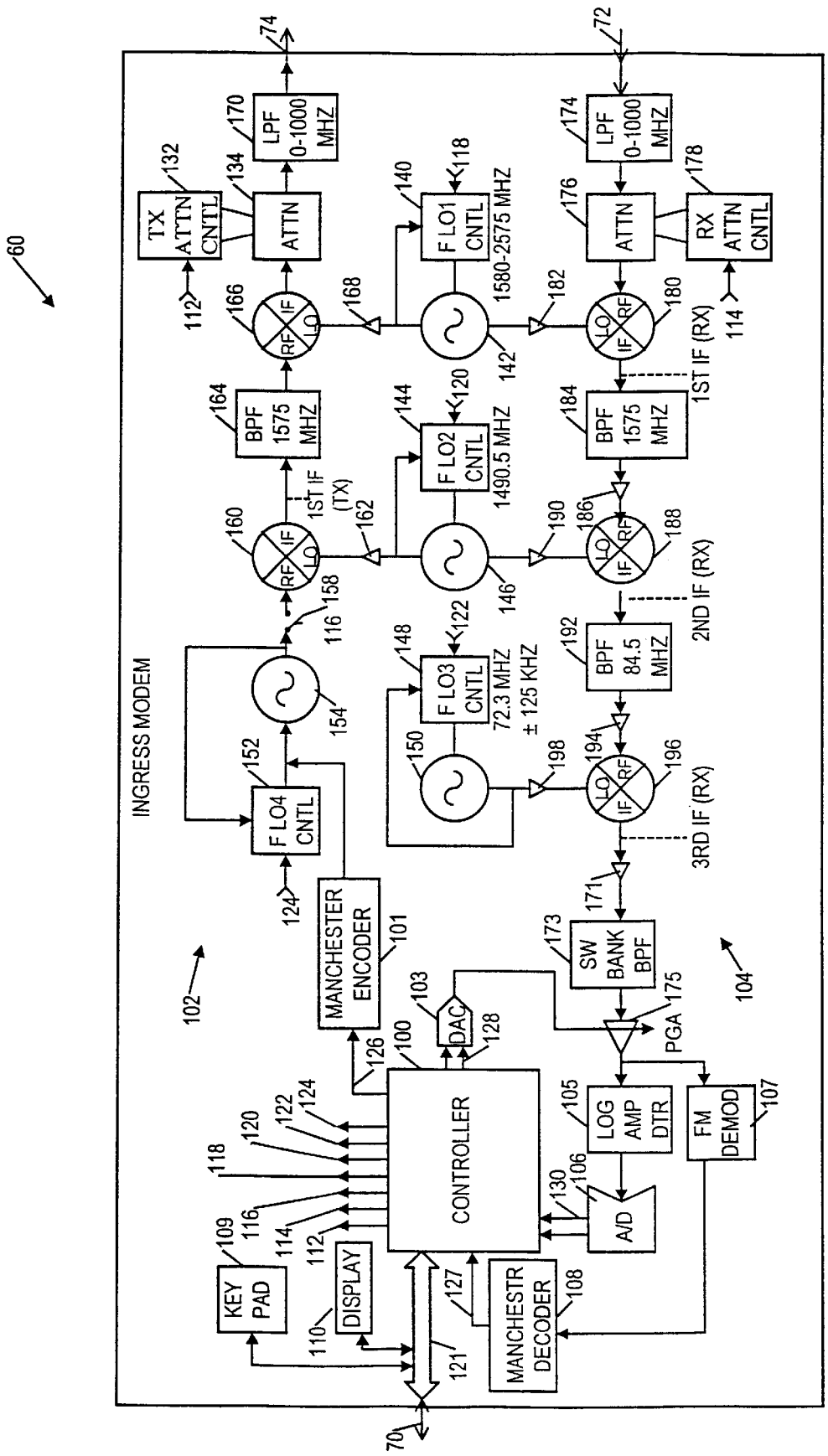
FIG. 3 shows in further detail the ingress modem of the testing services headend of FIG. 2.

Referring to FIG. 3 there is shown a detailed circuit diagram of the ingress modem 60. The ingress modem 60 includes a controller 100, a manchester encoder 101, an RF transmitter 102, a digital to analog converter 103, an RF receiver 104, a log amp detector 105, an analog to digital converter 106, a FM demodulator 107, a manchester decoder 108, a keypad 109, and a display 110. The controller 100 has a transmitter attenuator control output 112, a receiver attenuator control output 114, an RF on/off control output 116, oscillator frequency control data outputs 118, 120, 122, 124, serial data output 126, serial data input 127, data outputs 128, data inputs 130, and a serial bus interface 121.

Illustratively, the controller 100 is a microcontroller that includes program memory for storing firmware routines for the controller 100 and data memory for storing data generated by the controller 100. In the exemplary embodiment, the controller 100 is implemented with conventional circuitry, such as a MC68331 microcontroller manufactured by Motorola, Inc., Motorola, Microprocessor Product Group, 6501 William Cannon Drive West, Oakhill, Tex. 78735, and outputs 112, 114, 116, 118, 120, 122, 124, 126, and 128 and data inputs 127 and 130 are appropriate inputs and outputs of the microcontroller. Likewise, the serial bus interface 121 is an appropriate serial interface of the microcontroller. The keypad 109 and the display 110 are illustratively coupled to the serial bus interface 121. The serial bus interface 121 also couples the communications port 70 to the controller 100.

The transmitter control output 112 is coupled to an attenuator controller 132 which in turn is coupled to an attenuator 134. The RF on/off output 116 is coupled to an RF on/off switch 158.

The oscillator frequency control data outputs 118 are coupled to a first oscillator controller 140 which in turn is coupled to a first voltage controlled oscillator (VCO) 142. The oscillator frequency control data outputs 120 are coupled to a second oscillator controller 144 which in turn is coupled to a second voltage controlled oscillator 146. The oscillator frequency control data outputs 122 are coupled to a third oscillator controller 148 which in turn is coupled to a third voltage controlled oscillator 150. The oscillator frequency control data outputs 124 are coupled to a fourth oscillator controller 152 which in turn is coupled to a fourth voltage controlled oscillator 154.

Illustratively, the first oscillator controller 140 and the first voltage controlled oscillator 142 comprise a programmable phase-lock-loop circuit (programmed via the oscillator frequency control outputs 118 of the controller 100) as do the second oscillator controller 144 and the second voltage controlled oscillator 146 (programmed via the oscillator frequency control outputs 120 of the controller 100), the third oscillator controller 148 and the third voltage controlled oscillator 150 (programmed via oscillator frequency control outputs 122 of the controller 100), and the fourth oscillator controller 152 and the fourth voltage controlled oscillator 154 (programmed via oscillator frequency control outputs 124 of the controller 100).

The serial data output 126 is coupled to an input of the manchester encoder 101. (The manchester encoder 101 may suitably be a HD3-6409-9 manufactured by Hitachi, America Ltd., Semiconductor/IC Sales and Service Div., 1800 Bering Drive, San Jose, Calif. 95112.) An output of the manchester encoder 101 is coupled to an input of the fourth VCO 154. An output of the fourth VCO 154 is coupled through the RF on/off switch 158 to an RF input of a first TX mixer 160. An output of the second VCO 146 is coupled through a buffer amplifier 162 to a local oscillator input of the first TX mixer 160. An IF output of first TX mixer 160 is coupled through a 1575 MHz band pass filter 164 with a 15 MHz pass band to an RF input of a second TX mixer 166. An output of first VCO 142 is coupled though a buffer amplifier 168 to a local oscillator input of the second TX mixer 166. An IF output of the second TX mixer 166 is coupled though TX attenuator 134 and a low pass filter 170 with a 1000 MHz cutoff frequency to the RF output jack 74.

The RF output jack 74 enables a coaxial cable to detachably couple the ingress modem 60 to the signal combiner 28 of the headend facility 20. The low pass filter 170, the TX attenuator 134, the TX attenuator controller 132, the second TX mixer 166, the buffer amplifier 168, the first VCO 142, the first oscillator controller 140, the band-pass filter 164, the first TX mixer 160, the buffer amplifier 162, the second VCO 146, the second oscillator controller 144, the RF switch 158, the fourth VCO 154, and the first oscillator controller 152 comprise the RF transmitter 102. As will be explained below, the VCOs 142 and 146 and their controllers 144 and 148 also comprise part of the RF receiver 104.

The RF receiver 104 includes a low pass filter 174 with a 1000 MHz cutoff frequency, a RX attenuator 176, an RX attenuator controller 178, a first RX mixer 180, a buffer amplifier 182, a 1575 MHz band pass filter 184 with a 15 MHz pass band, a buffer amplifier 186, a second RX mixer 188, a buffer amplifier 190, a 84.5 MHz band pass filter 192 with a 4 MHz pass band, a buffer amplifier 194, a third RX mixer 196, a buffer amplifier 198, a buffer amplifier 171, a 10.7 MHz switched bank band pass filter 173 with a programmable pass band of 30 KHz, 300 KHz, or 2 MHz, and a programmable gain amplifier (PGA) 175. The RF input jack 72 is coupled to the low pass filter 174. The RX attenuator controller 178 has an input coupled to the RX attenuator controller output 114 of the controller 100 and an output coupled to the RX attenuator 176.

The first VCO oscillator 142 has its output also coupled through the buffer amplifier 182 to a local oscillator input of the first RX mixer 180. An IF output of first RX mixer 180 is coupled through the 1575 MHz band-pass filter 184 and a buffer amplifier 186 to a RF input of the second RX mixer 188. The second VCO 146 has its output also coupled though a buffer amplifier 190 to a local oscillator input of the second RX mixer 188. An IF output of the second RX mixer 188 is coupled though a buffer amplifier 194 to an RF input of the third RX mixer 196.

The third VCO 150 has its output coupled though a buffer amplifier 198 to a local oscillator input of the third RX mixer 196. An IF output of the third RX mixer 196 is coupled via the buffer amplifier 171 and the switched bank band pass filter 173 to a signal input of the PGA 175. A control input of the PGA 175 is coupled to an output of a digital to analog converter 103. Data inputs of digital to analog converter 103 are coupled to the data bus output 128 of the controller 100.

An output of the PGA 175 is coupled to an input of the log amp detector 105. An output of the log amp detector 105 is coupled to an input of the analog to digital converter 106. Data outputs of the analog to digital converter 106 are coupled to the data inputs 130 of the controller 100. The output of the PGA 175 is also coupled to an input of the FM demodulator 107. An output of the FM demodulator 107 is coupled to an input of the manchester decoder 108. (The manchester decoder 108 is illustratively a HD3-6409-9.) An output of the manchester decoder 108 is coupled to a serial data input 127 of the controller 100.

During the telemetry cycle, the telemetry signals from controller 100, encoded by the manchester encoder 101, are inserted into or modulated onto the RF signal to be transmitted by RF transmitter 102 at the fourth VCO 154. The signal generated by the fourth VCO 154 is mixed with the local oscillator signal generated by the second VCO 146 by the first TX mixer 160 which converts the signal generated by the fourth VCO 154 to a first IF signal having a first IF frequency (illustratively 1575 MHz). The first IF signal is then filtered by the band-pass filter 164 and the filtered first IF signal is mixed with the first local oscillator signal generated by the first VCO 142.

The first VCO 142 can be programmed by the controller 100 via oscillator controller 140 in 250 KHz increments to any frequency between 1580 MHz and 2575 MHz. The first local oscillator signal generated by first VCO 142 is mixed with the first IF signal from first TX mixer 160 (nominally, 1575 MHz) and the resultant signal is a signal having a frequency between 5 MHz and 1000 MHz. This resultant signal is then attenuated by the programmable TX attenuator 134 which has been programmed by the controller 100 via the TX attenuator controller 132, filtered by the low pass filter 170, and transmitted to the signal combiner 28 via the RF output jack 74. To provide a high degree of isolation when the first VCO 142 is being tuned, the fourth VCO 144 is turned off.

The RF receiver 104 is a super heterodyne receiver. The signal from RF input jack 72 is first filtered by low pass filter 174. The filtered signal is then passed through the programmable RX attenuator 176 which is used to lower the signal level in the event that the received signal level is too high and is over driving the RF receiver 104. The attenuated signal is then mixed by the first RX mixer 180 with the frequency to which the first VCO 142 is tuned in order to generate at the IF output of the first RX mixer 180 the first IF signal of the RF receiver 104, which is nominally 1575 MHz. The first IF signal is then filtered by the band-pass filter 184 to remove any IF images and mixed by the second RX mixer 18 with the second VCO 146 to produce the second IF signal (nominally 84.5 MHz) of the RF receiver 104. The second IF signal is filtered by the band-pass filter 192 and mixed with the third VCO 150 by the third RX mixer 196 to produce the third IF signal (nominally 10.7 MHz) of RF receiver 104. The third VCO 150 can be programmed by the controller 100 in 10 KHz increments to any frequency between 72.17 KHz and 72.42 KHz.

The third IF signal of RF receiver section 104 is filtered by the switched bank band-pass filter 173 and then passed through the PGA 175. The output of the PGA 175 is provided to both the log amp detector 105 and the FM demodulator 107. The log amp detector 105 generates a DC voltage which is representative of the signal level of the output of the PGA 175 and the RF signal received by the RF input jack 72. The output of log amp detector 105 is digitized by analog to digital converter 106 and this digitized value is read by the controller 100. The controller 100 uses the digitized value read from analog to digital converter 106 to determine how much gain to program into the PGA 175 via the digital to analog converter 106 so as to (i) provide a signal to analog to digital converter 106 having a sufficient magnitude so that accurate level measurements can be made, and (ii) provide a signal to the FM demodulator 107 having a sufficient magnitude so that the FM demodulator 107 may accurately demodulate the signal. Furthermore, the FM demodulator demodulates the output of the PGA 175 in order to extract a telemetry message. The manchester decoder 108 decodes the extracted telemetry message and provides a serial bit stream of the decoded message to the controller 100.

Figure 4:
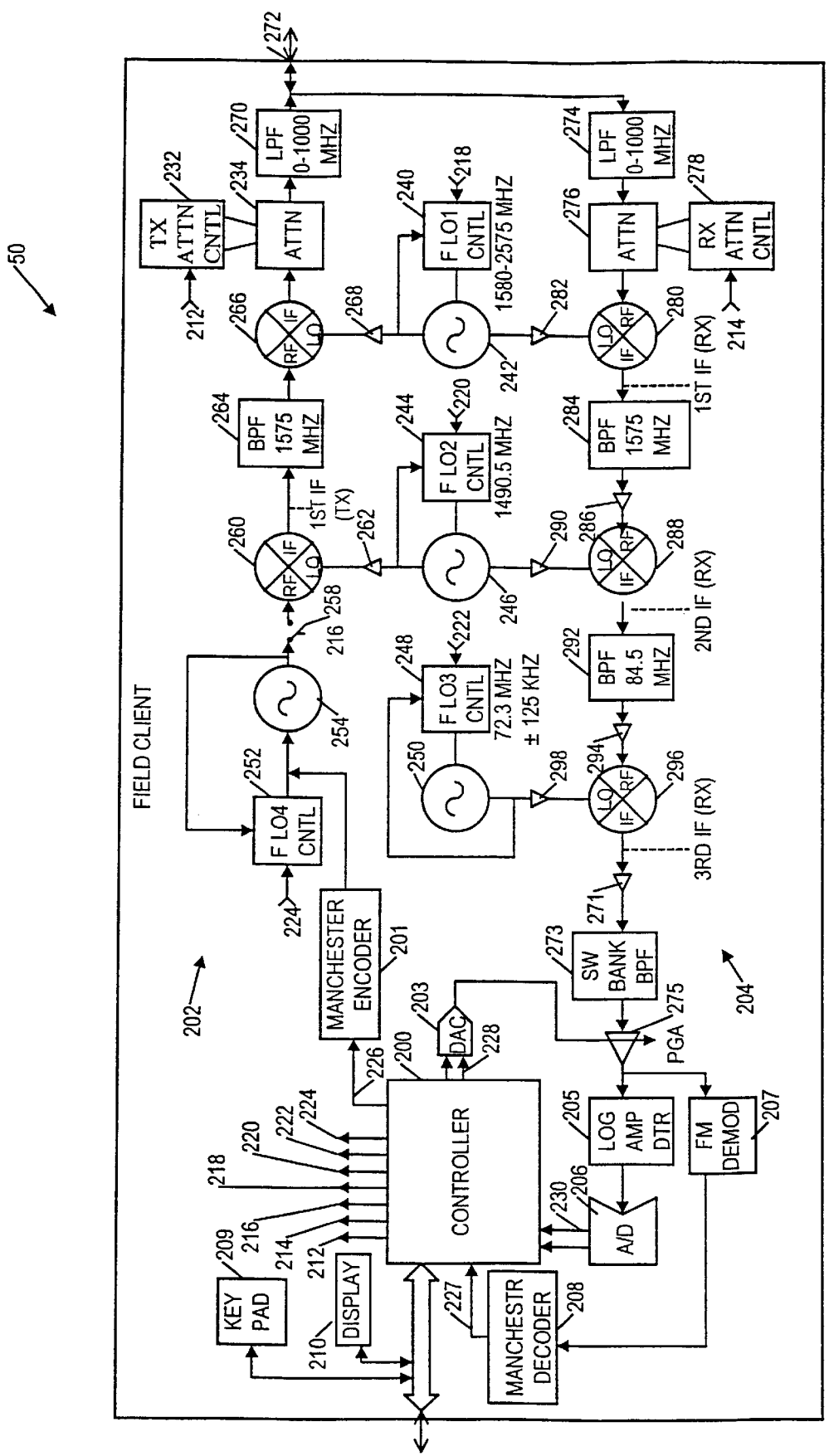
FIG. 4 shows in further detail a field client which may be used as one of field clients in the CATV system of FIG. 1.

Referring now to FIG. 4, the field client 50$_1$ is shown in greater detail. The field clients 50$_1$ and 50$_2$ may be implemented with substantially the same circuitry as that of the ingress modem 60. The only appreciable differences are in the routines which the controller 100 of the ingress modem and the controller 200 of the field client 50$_1$ execute and in the fact that the field client 50$_1$ includes a single RF jack 272 for sending and receiving RF signals. Accordingly, the circuitry of the field client 50$_1$ will not be discussed in further detail.

Figure 5:
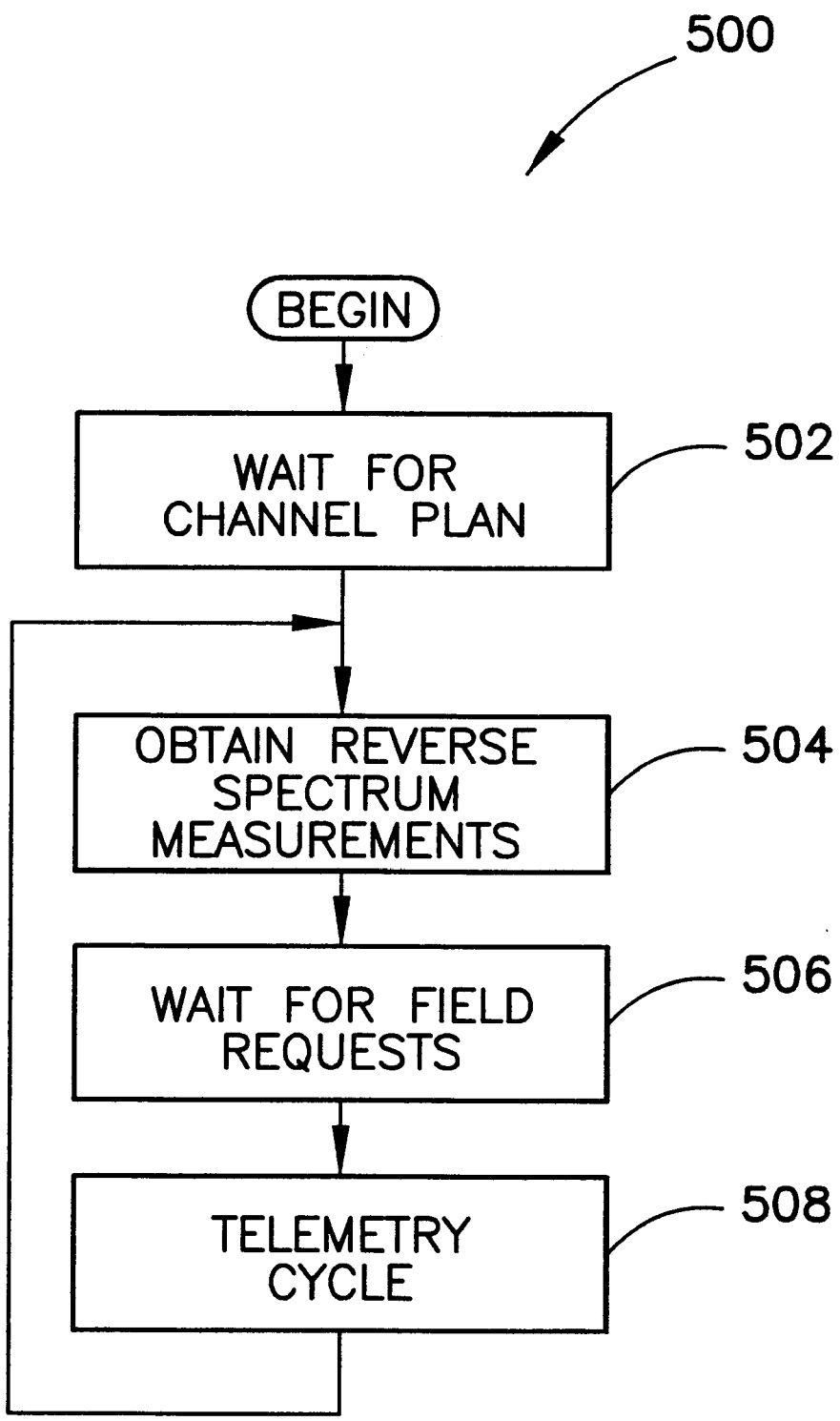
FIG. 5 shows a flowchart of the operation of the ingress modem of FIG. 2.

The general operation of the ingress modem 60 during ingress testing of the CATV system 10 is shown in FIG. 5. In step 502, the ingress modem 60 waits for a technician to enter a channel plan via the keypad 109. In particular, a technician enters a start frequency F_START, a stop frequency F_STOP, a bandwidth setting B_SET, and a default node identifier N_ID$_D$ which in a preferred embodiment corresponds to signal input 63$_{N+1}$ of the test point switch 64.

Then, in step 504, the ingress modem 60 performs a spectrum sweep of the default node N_ID$_D$ and any node listed in a node list. The node list is a list of nodes for which the ingress modem 60 performs a reverse spectrum measurement. Initially, the node list is empty. Addition of node identifiers to the node list is discussed further below. In sweeping the nodes, the ingress modem 60 obtains for each swept node a reverse spectrum measurement that includes a signal level measurement for each point of the spectrum sweep.

After obtaining the reverse spectrum measurement, the ingress modem 60 in step 506 waits for reverse telemetry messages which that identifies requests from the field clients 50$_X$ to test a particular node 32$_Y$ of the CATV distribution network. If the ingress modem 60 receives a reverse telemetry message contain a node that is not on the node list, then the ingress modem 60 adds the requested node 32$_Y$ to the node list.

Then, the ingress modem 60 in step 508 enters a telemetry cycle. In particular, the ingress modem 60 transmits to the field clients 50$_X$ via the CATV distribution network 30, a forward telemetry message which contains the reverse spectrum measurements, and receives from the field clients 50$_X$ synchronization/acknowledgment pulses via the CATV distribution network 30. The ingress modem 60 then returns to step 504 to perform new spectrum sweeps for the nodes on the updated node list and proceeds accordingly.

Figure 6:
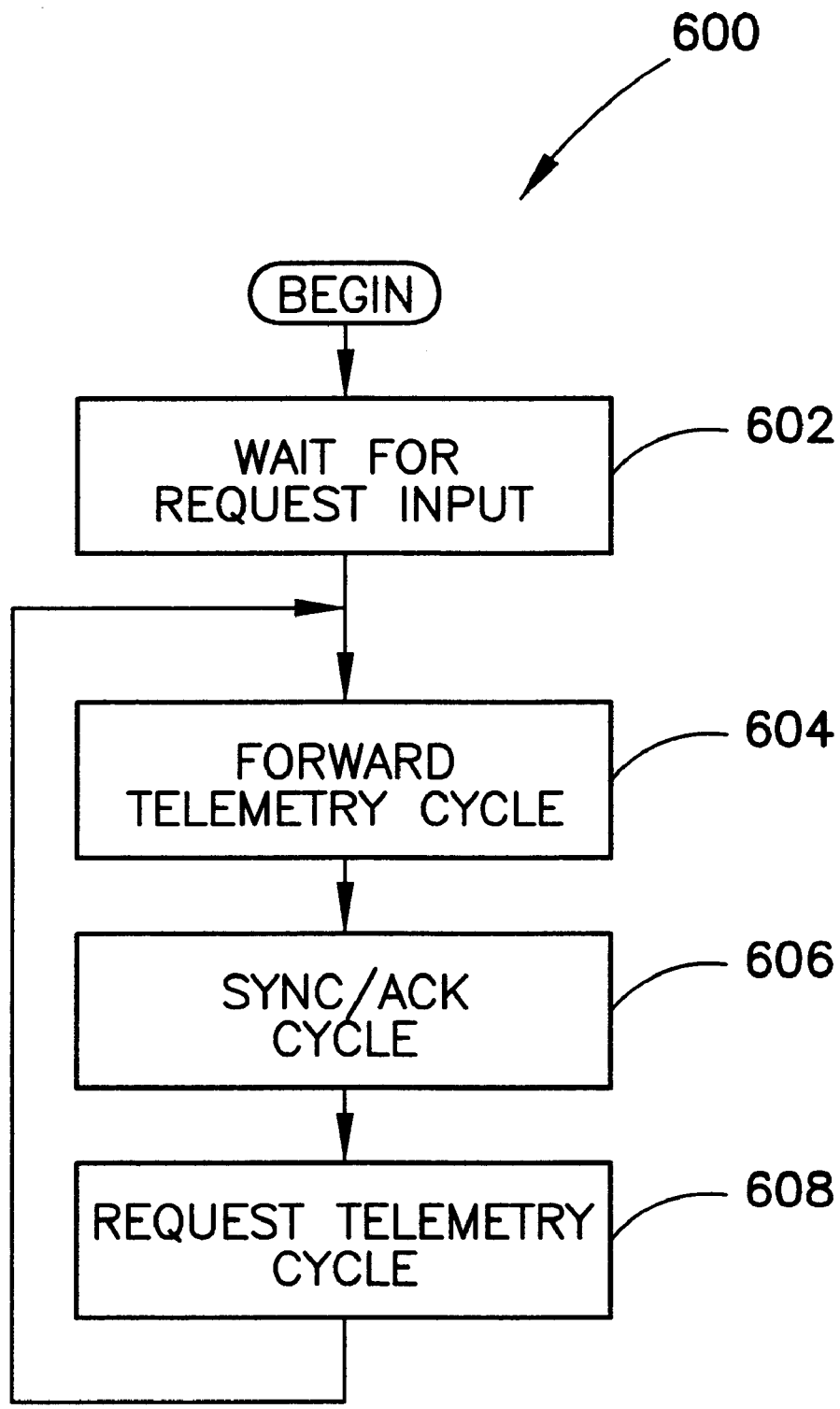
FIG. 6 shows a flowchart of the operation of the field client of FIG. 4.

The general operation of a field client 50$_X$ during ingress testing of the CATV system 10 is shown in FIG. 6. In step 602, the field client 50$_X$ waits for a technician to enter a request to ingress test a node 32$_Y$. Then in step 604, the field client 50$_X$ receives the forward telemetry signal transmitted by the ingress modem 60 during step 508 of FIG. 5. The field client 50$_X$ extracts the reverse spectrum measurements from the forward telemetry message and displays reverse spectrum measurements if they have been marked as measurements for the requested node 32$_Y$. Then in step 606, the field client 50$_X$ transmits an appropriate synchronization/acknowledgement pulse upon the CATV distribution network 30. After transmitting the synchronization/acknowledgement pulse, the field client 50$_X$ in step 608 transmits a reverse telemetry message which contains a request to perform a reverse ingress test of the node 32$_Y$. The reverse telemetry message is received by the ingress modem 60 in step 506 of FIG. 5 thereby causing the ingress modem 60 to add the node 32$_X$ to the node list.

Figure 7:
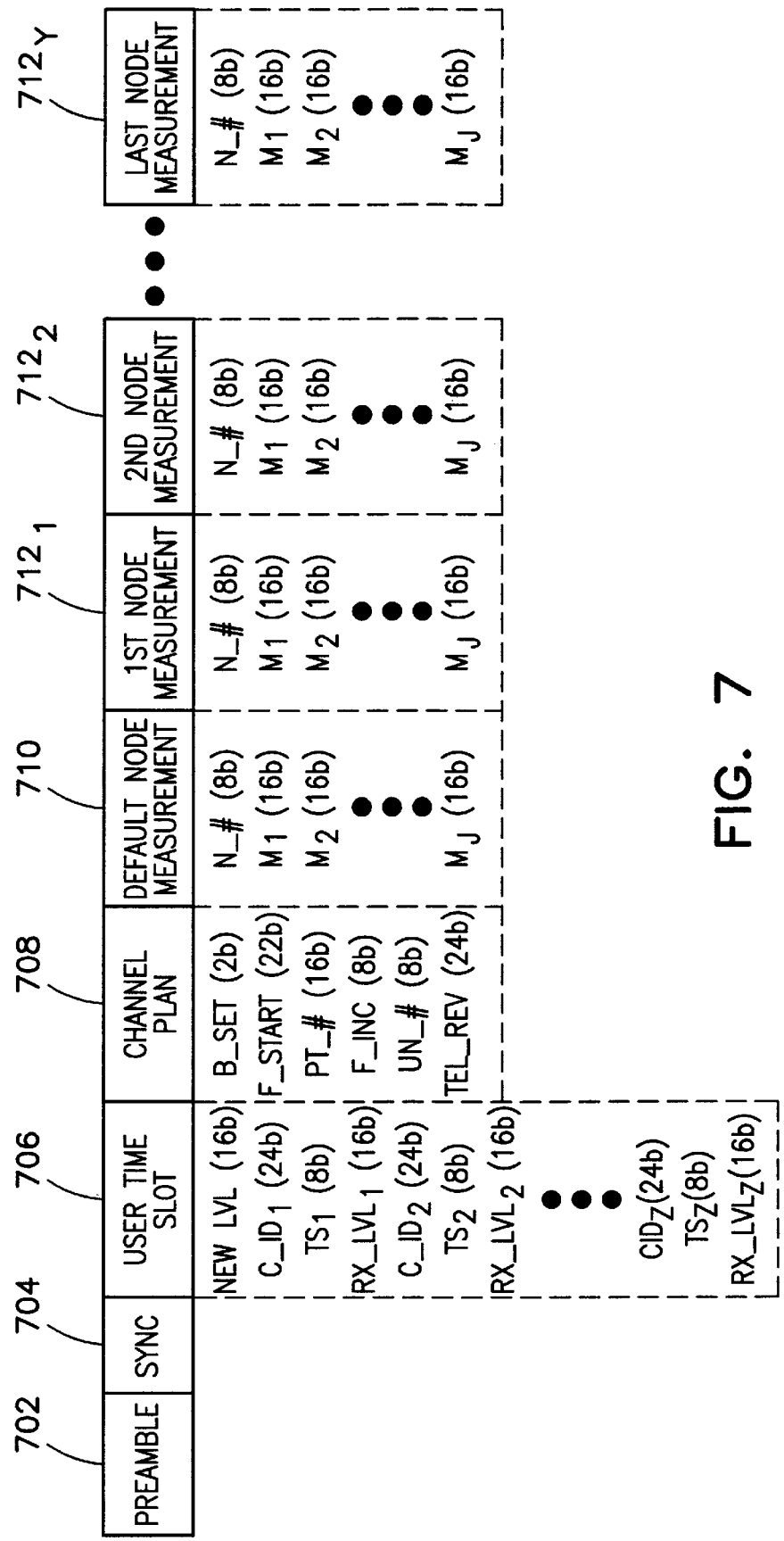
FIG. 7 shows an exemplary structure for a forward telemetry message that is transmitted by the ingress modem of FIG. 2.

As shown in FIG. 7, the forward telemetry message includes a preamble section 702, a synchronization section 704, a user time slot section 706, a channel plan section 708, a default node measurement section 710, and zero or more user requested measurement sections 712$_1$, 712$_2$ . . . 712$_Y$. The preamble section 702 provides the receivers 204 of the field clients 50$_X$ time to perform gain control. In the exemplary embodiment, the preamble section is a 10 millisecond (msec) period which allows the controller 200 of the field clients 50$_X$ to adjust the gain of the PGA 175 so that accurate measurements may be obtained and accurate demodulation may occur. The synchronization section 704 includes a predefined bit stream which is used by the manchester decoders 208 of the field clients 50$_X$ in order to identify the start of the user time slot section 706.

The user time slot section 706 contains a new request level NEW_LVL, client identifiers C_ID$_1$, C_ID$_2$ . . . C_ID$_Z$, time slots TS$_1$, TS$_2$ . . . TS$_Z$, and received levels RX_LVL$_1$, RX_LVL$_2$ . . . RX_LVL$_Z$. The new request level NEW_LVL represents a signal level measurement obtained by the ingress modem 60 during the latest receive request step 506 and in the exemplary embodiment is a 16 bit value.

The signal level measurement provides a measurement of the signal strength on the reverse telemetry channel which is used to verify proper transmission and reception of reverse telemetry signals as discussed further below. The client identifiers C_ID$_1$, C_ID$_2$ . . . C_ID$_Z$ identify field clients 50$_X$ and mark parts of the forward telemetry message as corresponding to a particular field client 50$_X$. For example, the client identifier C_ID$_1$ marks the time slot TS$_1$, and the received level RX_LVL$_1$ as corresponding to the field client 50$_X$ having a serial number equal to the client identifier C_ID$_1$. In an exemplary embodiment, the client identifiers C_ID$_1$, C_ID$_2$ . . . C_ID$_Z$ are each a 24 bit value.

The time slots TS$_1$, TS$_2$ . . . TS$_Z$ provide each field client 50$_X$ a separate time slot in which the ingress modem 60 is expecting to receive a synchronization/acknowledgment pulse from the field client $50_X$. The received levels $RX\_LVL_1$, $RX\_LVL_2$ . . . $RX\_LVL_Z$ represent a signal level measurement obtained by the ingress modem 60 of the reverse telemetry signal transmitted by the field client $50_X$. The field client may use its received level $RX\_LVL_X$ to adjust the level of future transmitted reverse telemetry signals. In the exemplary embodiment, the time slots $TS_1$, $TS_2$ . . . $TS_Z$ are each an 8 bit value, and the received levels $RX\_LVL_1$, $RX\_LVL_2$ . . . $RX\_LVL_Z$ are each a 16 bit value. Moreover, since the user time slot section 706 is variable in length depending upon the number of field clients requested ingress testing, the user time slot section 706 in the exemplary embodiment includes at the end of the section a client identifier $C\_ID_Z$ of 0x000000, a time slot $TS_Z$ of 0x00, and a received level $RX\_LVL_Z$ of x0000.

The channel plan section 708 includes the bandwidth setting B_SET, a start frequency F_START, a point number PT_#, a frequency increment F_INC, a unique node number UN_#, and a reverse telemetry frequency TEL_REV. The bandwidth setting B_SET is a 2 bit value which informs the field clients $50_X$ which bandwidth setting B_SET the ingress modem 60 used in obtaining the reverse spectrum measurements. In particular, the bandwidth setting B_SET informs the field clients $50_X$ whether the wide (2 MHz), medium (250 KHz), or narrow (30 KHz) bandwidth setting was used. The start frequency F_START is a 22 bit value which indicates at which frequency the ingress modem 60 began taking measurements. The point number PT_# is a 16 bit value which indicates the number of measurement points the ingress modem 60 made for each node $32_X$ tested. The frequency increment F_INC is an 8 bit value which indicates the frequency increment the ingress modem 60 used in obtaining the reverse spectrum measurements. The unique node number UN_# is a 8 bit value that indicates the number of nodes $32_1$, $32_2$, . . . $32_N$ for which the ingress modem 60 obtained reverse spectrum measurements. The reverse telemetry frequency TEL_REV is a 24 bit value that indicates the frequency at which the field clients should transmit reverse telemetry signals.

The default measurement section 710 includes a node number N_# that is equal to the node identifier $N\_ID_D$ for the default node and a plurality of measurement values $M_1$, $M_2$ . . . $M_J$ where J is equal to the point number PT_#. The node number N_# is a 8 bit value that identifies from which node $32_Y$ the measurement values $M_1$, $M_2$ . . . $M_J$ were obtained. Moreover, each measurement value $M_1$, $M_2$ . . . $M_J$ is a 16 bit value which represents a single point of the reverse spectrum measurement done by the ingress modem 60. The measurement sections $712_1$, $712_2$ . . . $712_K$ also include node numbers N_# and measurement values $M_1$, $M_2$ . . . $M_J$ that function in the same manner as the node number N_# and the measurement values $M_2$, $M_2$ . . . $M_J$ of the default measurement section 710. However, it should be appreciated that if no field client $50_X$ has requested the node $32_Y$, then the forward telemetry message may contain no measurement sections $712_1$, $712_2$ . . . $712_K$.

Figure 8:
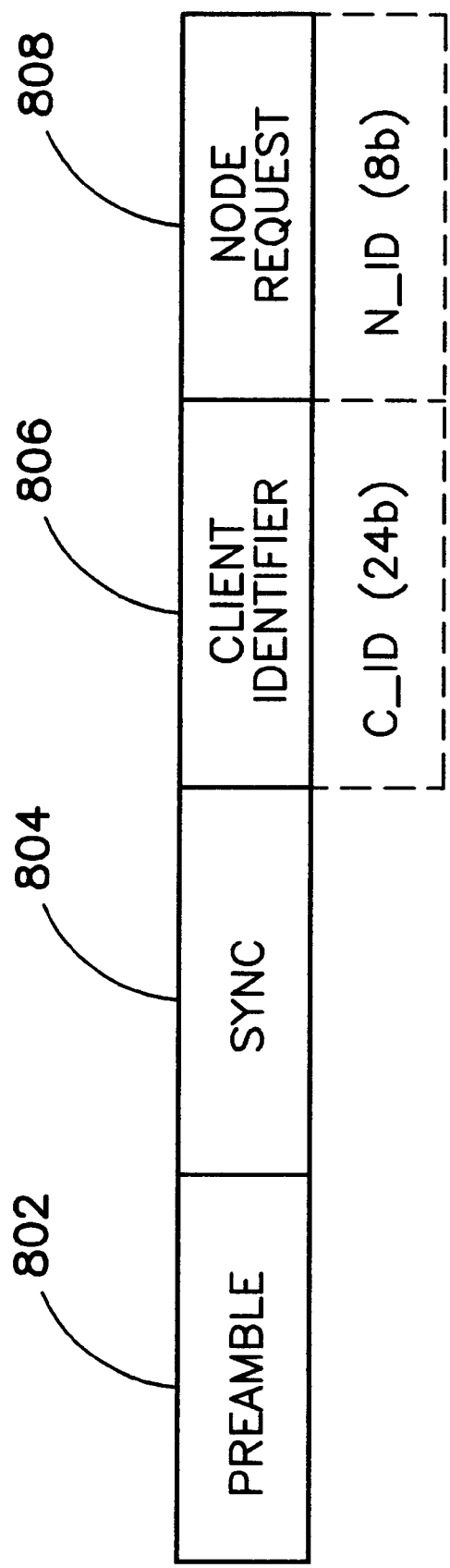
FIG. 8 shows an exemplary structure for a reverse telemetry message that is transmitted by the field client of FIG. 4.

As shown in FIG. 8, the reverse telemetry message includes a preamble section 802, a synchronization section 804, a client identifier section 806, and a node request section 808. The preamble section 802 provides the receiver 104 of the ingress modem 60 time to perform gain control. In the exemplary embodiment, the preamble section 802 is a 10 millisecond (msec) period which allows the controller 100 of the ingress modem 60 to adjust the gain of the PGA 175 to facilitate accurate measurements and accurate demodulation. The synchronization section 804 includes a predefined bit stream which is used by the manchester decoders 108 of the ingress modem 60 in order to identify the start of client identifier section 806.

The client identifier section 806 includes a client identifier C_ID that is a 24 bit value which identifies the field clients $50_X$ that sent the reverse telemetry message. In particular, the client identifier C_ID is equal to the serial number that has been programmed into the field client $50_X$. The node request section 808 includes a node identifier N_ID that is a 8 bit value the identifies the node $32_Y$ for which ingress testing is requested.

Figure 9A:
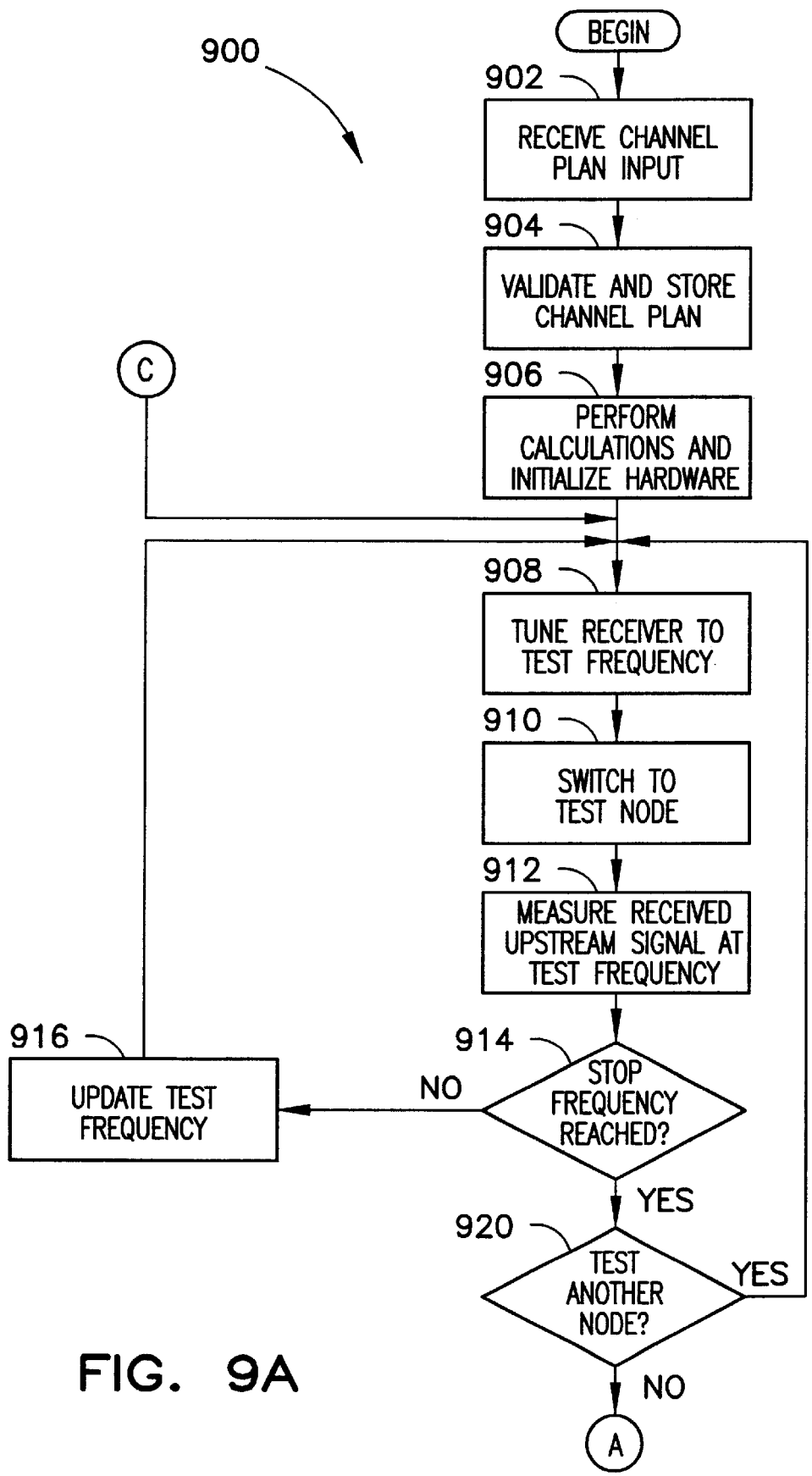
FIGS. 9A–9C show a flowchart of a routine executed by the ingress modem controller of FIG. 3.
Figure 9B:
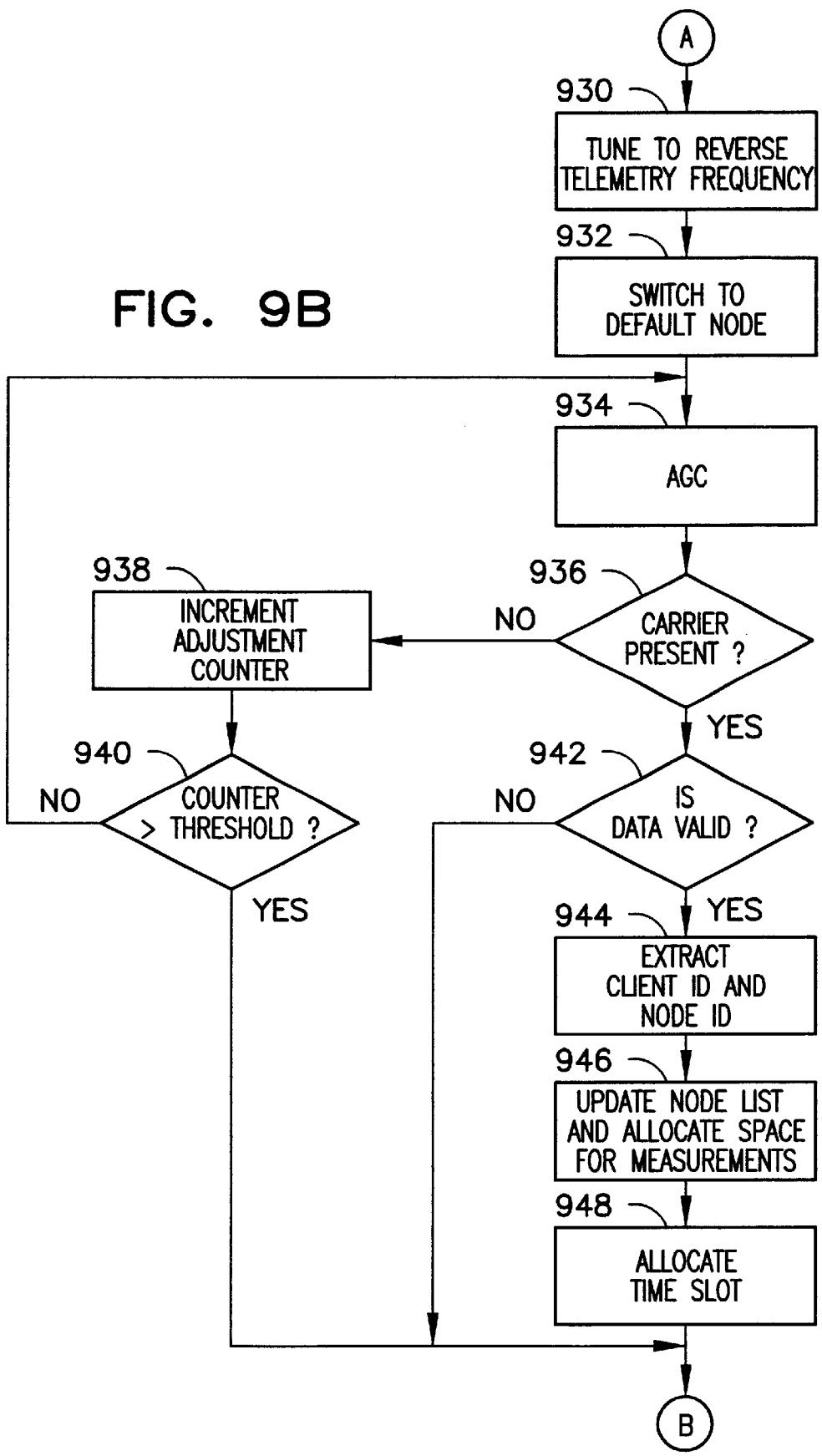
Figure 9C:
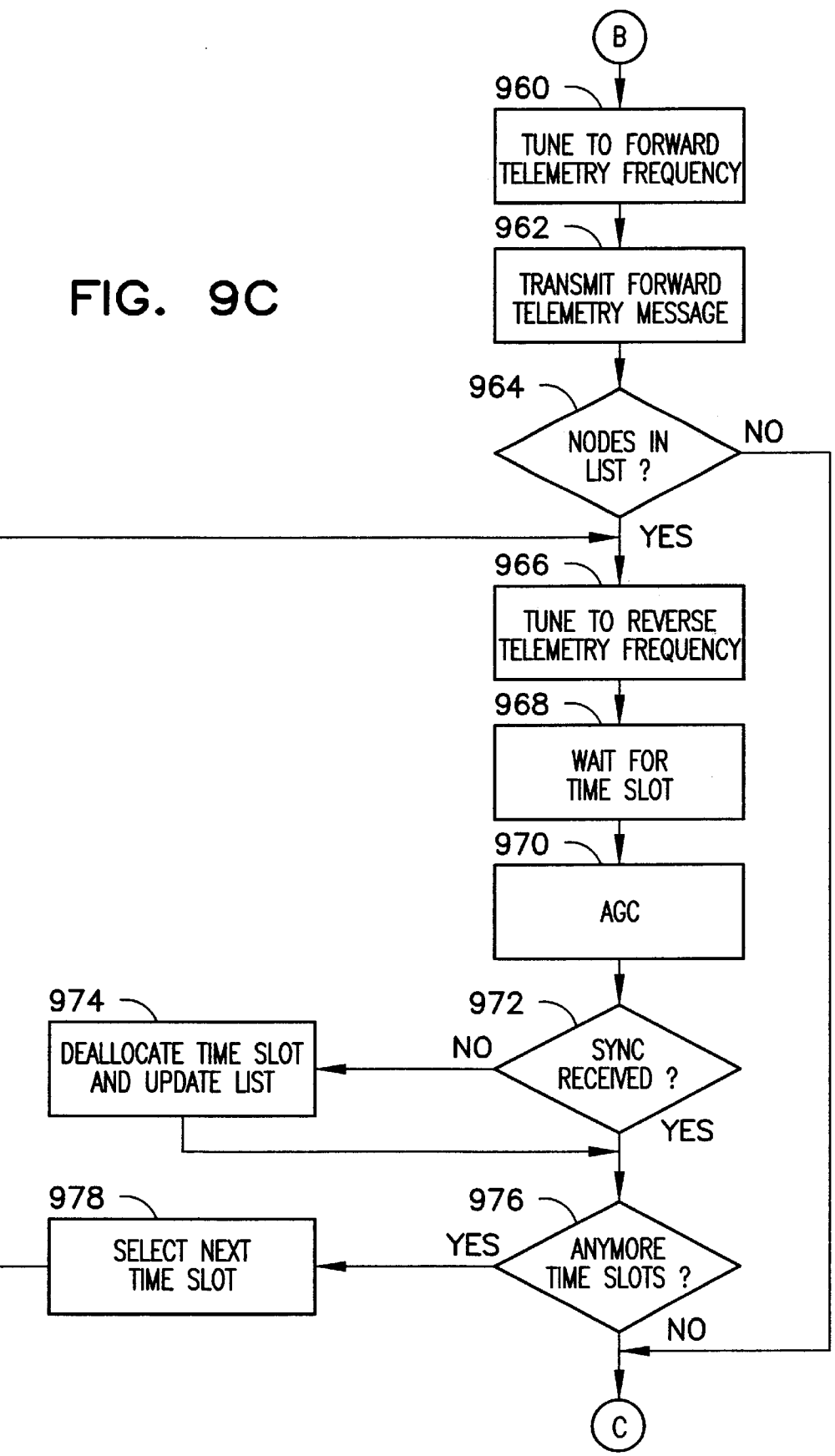

Referring now to FIGS. 9A–9C, there is shown a detailed flowchart for a ingress testing routine 900 which is executed by the controller 100 of the ingress modem 60. By executing the routine 900, the controller 100 causes the ingress modem 60 to implement the general operation of FIG. 5. In particular, FIG. 9A illustrates steps for implementing the wait for channel plan step 502 and the reverse spectrum measurement step 504, FIG. 9B illustrates steps for implementing the waiting step 506; and FIG. 9C illustrates a routine for implementing the telemetry cycle step 508. As illustrated in FIG. 9A, the controller 100 in step 902 causes the ingress modem 60 to wait for a technician to enter a channel plan via the keypad 109. In particular, the controller 100 is operable to receive via the keypad 109 a start frequency F_START in MHz, a stop frequency F_STOP, a bandwidth setting B_SET, and a default node identifier $N\_ID_D$ which corresponds to signal input $63_{N+1}$ of the test point switch 64 that is coupled to the signal combiner 62.

The controller 100 in step 904 validates and stores the received channel plan. In particular, in one embodiment of the present invention, the start frequency F_START is limited to frequencies ranging from 5.00 to 149.00 MHz, the stop frequency F_STOP is limited to frequencies ranging from F_START+1.00 MHz to 150 MHz, the bandwidth B_SET is limited to three different choices (wide, medium, and narrow), and the default node identifier $N\_ID_D$ is limited to an integer ranging from 1 to 17. It should be appreciated that the above ranges are merely exemplary.

Then, in step 906, the controller 100 initializes circuit components and performs some initialization calculations. In particular, the controller 100 sets a test frequency F_TEST to the start frequency F_START, sets a test node N_TEST to the default node identifier $N\_ID_D$, and causes the switched bank pass band filter 173 to switch to the desired band pass. Accordingly, the controller 100 stores the test frequency F_TEST and the test node N_TEST in the memory of the controller 100 and transmits a control signal to the switched bank band pass filter 173 which causes the switched bank pass band filter 173 to switch to the pass band that is appropriate for the bandwidth setting B_SET. Illustratively, the controller 100 causes the switched bank pass band filter 173 to switch in the 2 MHz band pass when the bandwidth setting B_SET is set to wide, the 300 MHz band pass when the bandwidth setting B_SET is set to medium, and the 30 MHz band pass when the bandwidth setting B_SET is set to narrow.

The controller 100 thereafter, in step 908, causes the receiver 104 to tune to the test frequency F_TEST. The controller 100 transmits control signals to the first oscillator controller 140, the second oscillator controller 144, and the third oscillator controller 148 which cause the receiver 104 to shift the test frequency F_TEST portion of the RF signal received from the RF input jack 72 to the third IF frequency of 10.7 MHz. While the receiver 104 settles, the controller 100 causes the test point switch 64 in step 910 to operably couple the upstream signal from the test node N_TEST to the ingress modem 60. In particular, the controller 100 applies the stored test node N_TEST to the node selection input 65 of the test point switch 64 by transmitting the test node N_TEST over the communications link 66. In response to receiving the test node N_TEST, the test point switch 64 operably couples the signal input $63_Y$ of the test point switch 64 that corresponds to the test node N_TEST and the node $32_Y$ of the CATV distribution network 30. Accordingly, the ingress modem 60 receives the upstream signals from the appropriate node $32_Y$. For example, when the test node N_TEST is equal to the default node identifier N_ID$_D$, the test point switch 64 couples the composite upstream signal of the signal combiner 62 to the ingress modem 60, and when the test node N_TEST is equal to a node identifier N_ID$_Y$ which identifies a node $32_Y$ of the CATV distribution network 30, the test point switch 64 couples the upstream signal of the node $32_Y$ to the ingress modem 60.

After the receiver 104 settles to the test frequency F_TEST, the controller 100 obtains and stores a first measurement value for the RF signal received by the RF jack 72 (step 912). In particular, the log amp detector 105 generates a received strength signal indicator (RSSI) output based upon the filtered third IF signal of the receiver 104. The analog to digital converter 106 digitizes the RSSI output and provides the controller 100 with a digital value that is indicative of the RSSI output. The controller 100 receives the digital value, adjusts the digital value for gain or attenuation due to the receiver 104 and the PGA 175, and stores the adjusted digital value as a first measurement value for the upstream signal.

In step 914, the controller 100 determines whether the stop frequency F_STOP has been reached. In particular, the controller 100 compares the test frequency F_TEST to the stop frequency F_STOP. If the test frequency F_TEST is greater than the stop frequency F_STOP, then the controller 100 proceeds to step 920. However, if the test frequency F_TEST is not greater than the stop frequency F_STOP, then the controller 100 proceeds to step 916. In step 916, the controller 100 updates the test frequency F_TEST by adding a frequency increment F_INC to the test frequency F_TEST. The frequency increment F_INC is dependent upon the bandwidth setting B_SET. For example, in the exemplary embodiment, the frequency increment F_INC is equal to (i) 2 MHz when the bandwidth setting B_SET is set to wide, (ii) 250 KHz when the bandwidth setting B_SET is to medium, and 30 KHz when the bandwidth B_SET is set to narrow.

If the controller in step 914 determines that the stop frequency F_STOP has been reached, then the controller in step 920 determines whether another node is to be tested. The controller 100 makes this determination by accessing a node list stored in its memory. If the node list contains another node $32_P$, then the controller 100 sets the test node N_TEST to the node identifier N_ID$_P$ for the node $32_P$ to be tested and returns to step 908 to obtain measurement values for the upstream signals of the node $32_P$. On the other hand, if the node list does not contain another node to be tested, then the controller 100 proceeds to step 930 of FIG. 9B.

Referring now to FIG. 9B, the controller 100 in step 930 causes the receiver 104 to tune to a reverse telemetry frequency TEL_REV that has been preset in the ingress modem 60. Specifically, the controller 100 transmits control signals to the first oscillator controller 140, the second oscillator controller 144, and the third oscillator controller 148 which cause the receiver 104 to shift the reverse telemetry frequency TEL_REV portion of the RF signal received from the RF input jack 72 to the third IF frequency of 10.7 MHz.

While the receiver 104 settles, the controller 100 in step 932 causes the test point switch 64 to operably couple the composite upstream signal of the signal combiner 62 to the ingress modem 60. To this end, the controller 100 applies the stored default node identifier N_ID$_D$ to the node selection input 65 of the test point switch 64 by transmitting the default node identifier N_ID$_D$ over the communications link 66. In response to receiving the default node identifier N_ID$_D$, the test point switch 64 operably couples the signal input $63_{N+1}$ corresponding to the signal combiner 62 to the signal output 67. As a result, the ingress modem 60 receives the composite upstream signal of the signal combiner 62 via the RF input 74. It should be appreciated that since the field clients $50_1$ and $50_2$ may be coupled to the CATV distribution network 30 at locations downstream from any one of the nodes $32_1, 32_2 \ldots 32_N$ only the composite upstream signal of signal combiner 62 is assured of containing the reverse telemetry signal of the field clients $50_1$ and $50_2$.

Then, the controller 100 in step 934 performs an automatic gain control loop in order to provide the third IF signal to the FM demodulator 107 at an amplitude level desired by the FM demodulator 107. In particular, the controller 100 sets an adjustment counter ADJ_CNT to zero and continually adjusts the programmable gain amplifier 175 for 3 msec based upon signal level values received from the analog to digital converter 106.

After performing the automatic gain control loop, the controller 100 in step 936 determines whether the signal level of the third IF signal is greater than a carrier present level (e.g. −14 dBmV). If not, the controller 100 in step 938 increments the adjustment counter ADJ_CNT and in step 940 compares the incremented adjustment counter ADJ_CNT to a adjustment threshold ADJ_THR (e.g. 5). If the adjustment counter ADJ_CNT is less than the adjustment threshold ADJ_THR, then the controller 100 returns to step 934 in order to perform another automatic gain control loop. However, if the adjustment counter ADJ_CNT is not less than the adjustment threshold ADJ_THR, then the controller 100 assumes that no reverse telemetry signal was sent and proceeds to step 960 of FIG. 9C.

Referring again to FIG. 9B, after the controller 100 determines that the signal level of the amplified third IF signal is greater than the carrier present level, the controller in step 942 determines whether the reverse telemetry message extracted by the FM demodulator 107 and the manchester decoder 108 is valid. In particular, the manchester decoder 108 provides the controller 100 with a serial bit stream of the extracted reverse telemetry message and appended CRC value. Each reverse telemetry message has a CRC value that is appended to the reverse telemetry message when transmitted by the field client $50_X$. The controller 100 determines in a known manner from the CRC value and the extracted reverse telemetry message whether the reverse telemetry message is valid. If the reverse telemetry message is invalid, then the controller 100 discards the reverse telemetry message, assumes that no new nodes are to be added to the node list, and proceeds to step 960 of FIG. 9C. However, if the reverse telemetry message is valid, then the controller 100 in step 944 extracts a client identifier C_ID and a node identifier N_ID from the reverse telemetry message. Then in step 946, the controller 100 adds to the node list the extracted node identifier N_ID if the node identifier N_ID is not already in the node list, and allocates storage space for the measurement values to be obtained for the node $32_Y$ corresponding to the node identifier N_ID. Then, in step 948 the controller 100 allocates a 4 msec time slot $TS_X$ of a synchronization/acknowledgment period to the field client $50_X$ corresponding to the client identifier C_ID.

Referring now to FIG. 9C, the controller 100 in step 960 tunes the transmitter 102 to a forward telemetry frequency TEL_FOR. In particular, the controller 100 transmits control signals to the first oscillator controller 140, the second oscillator controller 144, and the fourth oscillator controller 152 which cause the transmitter 102 to generate a forward telemetry carrier that has a frequency equal to the forward telemetry frequency TEL_FOR. While the VCOs of the transmitter 102 settle, the controller 100 generates a forward telemetry message. In the exemplary embodiment, the controller 100 generates a forward telemetry message having a structure that is in accordance with the forward telemetry message of FIG. 7.

After the VCOs of the transmitter 102 settle, the controller 100 causes the transmitter 102 to transmit a forward telemetry signal which includes the generated forward telemetry message modulated upon. the forward telemetry carrier. To this end, the controller 100 provides a serial stream of data that represents the forward telemetry message to the Manchester encoder 101. The manchester encoder 101 in turn provides the transmitter 102 with an analog signal representation of the forward telemetry message, and the transmitter 102 generates and transmits the forward s telemetry signal which includes the forward telemetry message modulated upon the forward telemetry carrier.

In step 964, the controller 100 determines whether ingress modem 60 needs to wait for any synchronization/acknowledgment pulses. Specifically, the controller 100 determines whether the node list contains any node identifiers N_ID. If the node list does not contain any node identifiers N_ID, then the controller 100 returns to step 908 of FIG. 9A in order to perform another spectrum sweep of the default node. However, if the node list does contain node identifiers N_ID, then the controller 100 proceeds to step 966 in order for the controller 100 to determine whether synchronization/acknowledgment pulses are received in the proper time slots $TS_X$.

Then, the controller 100 in step 966 tunes the receiver 104 to the reverse telemetry frequency TEL_REV. The controller 100 in step 968 waits until the first allocated time slot $TS_X$. Once the first allocated time slot $TS_X$ is encountered, the controller 100 in step 970 performs an automatic gain control loop in order to provide the third IF signal to the FM demodulator 107 at an amplitude level desired by the FM demodulator 107. In particular, for a 3 msec period in the middle of the 4 msec time slot $TS_X$, the controller 100 continually adjusts the programmable gain amplifier 175 based upon signal level values received from the analog to digital converter 106. The controller in step 972 determines whether a synchronization/acknowledgment pulse was received during the automatic gain control loop. In particular, the controller 100 determines whether a signal level measurement value received from the analog to digital converter 110 during the automatic gain control loop was greater than the carrier level present level (e.g. −14 dBmV). If a signal level measurement value was greater than the carrier level present level, then the controller 100 proceeds to step 976; otherwise, the controller 100 proceeds to step 974.

In step 974, the controller 100 deallocates the time slot TS and removes the corresponding node identifier N_ID from the node list if no other field client has requested the node $32_Y$ corresponding to the node identifier N_ID. Then in step 976, the controller 100 determines whether other time slots TS have been allocated which need to be processed. If so, then the controller 100 in step 978 selects the next allocated time slot TS and returns to step 966 in order to determine whether the synchronization/acknowledgment pulse is received. However, if the controller 100 determines that all allocated time slots have been processed, then the controller 100 returns to step 908 of FIG. 9A in order to perform another spectrum sweep of the default node.

Figure 10A:
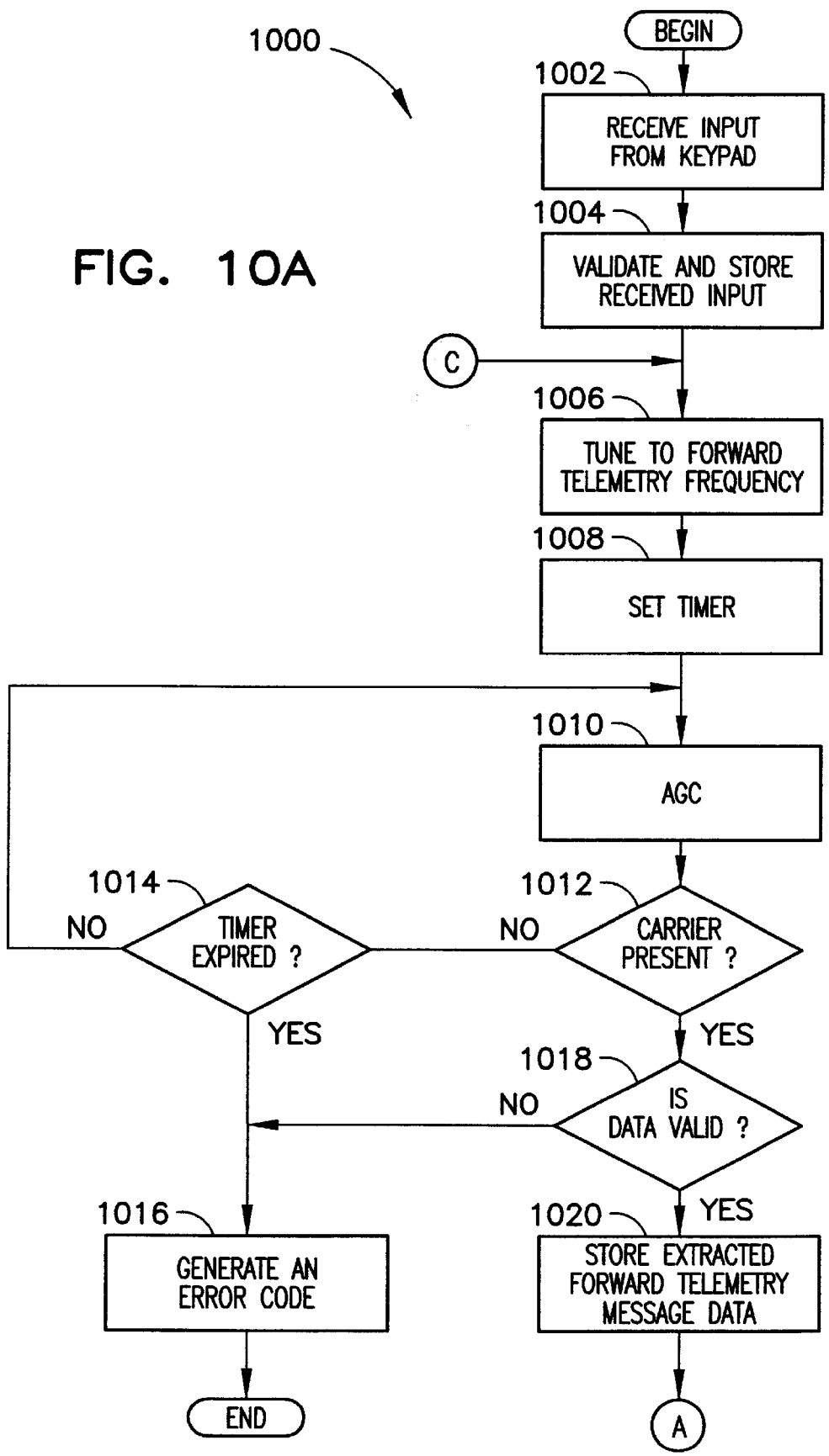
FIGS. 10A–10C show a flowchart of a routine executed by the field client controller of FIG. 4.
Figure 10B:
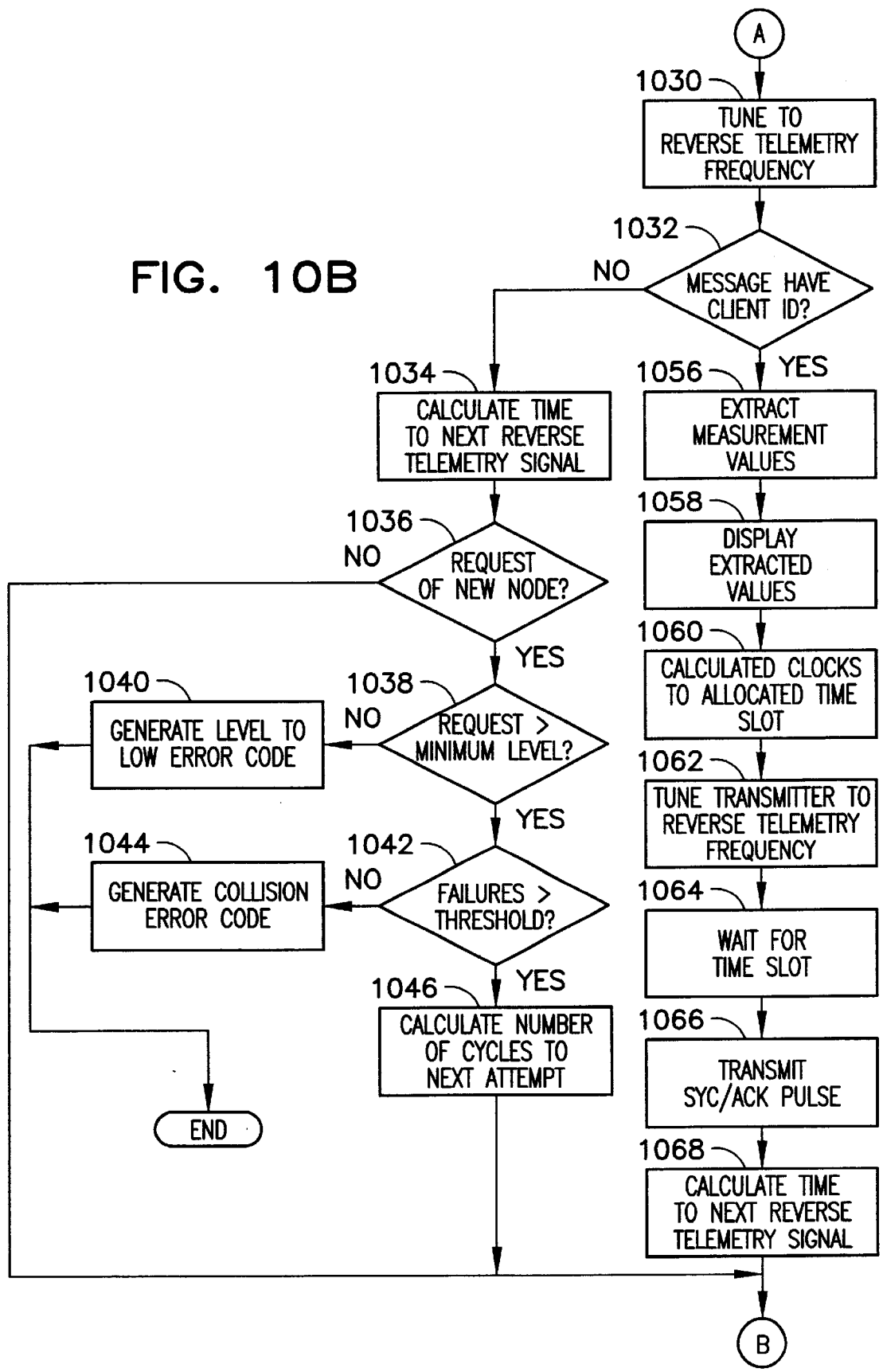
Figure 10C:
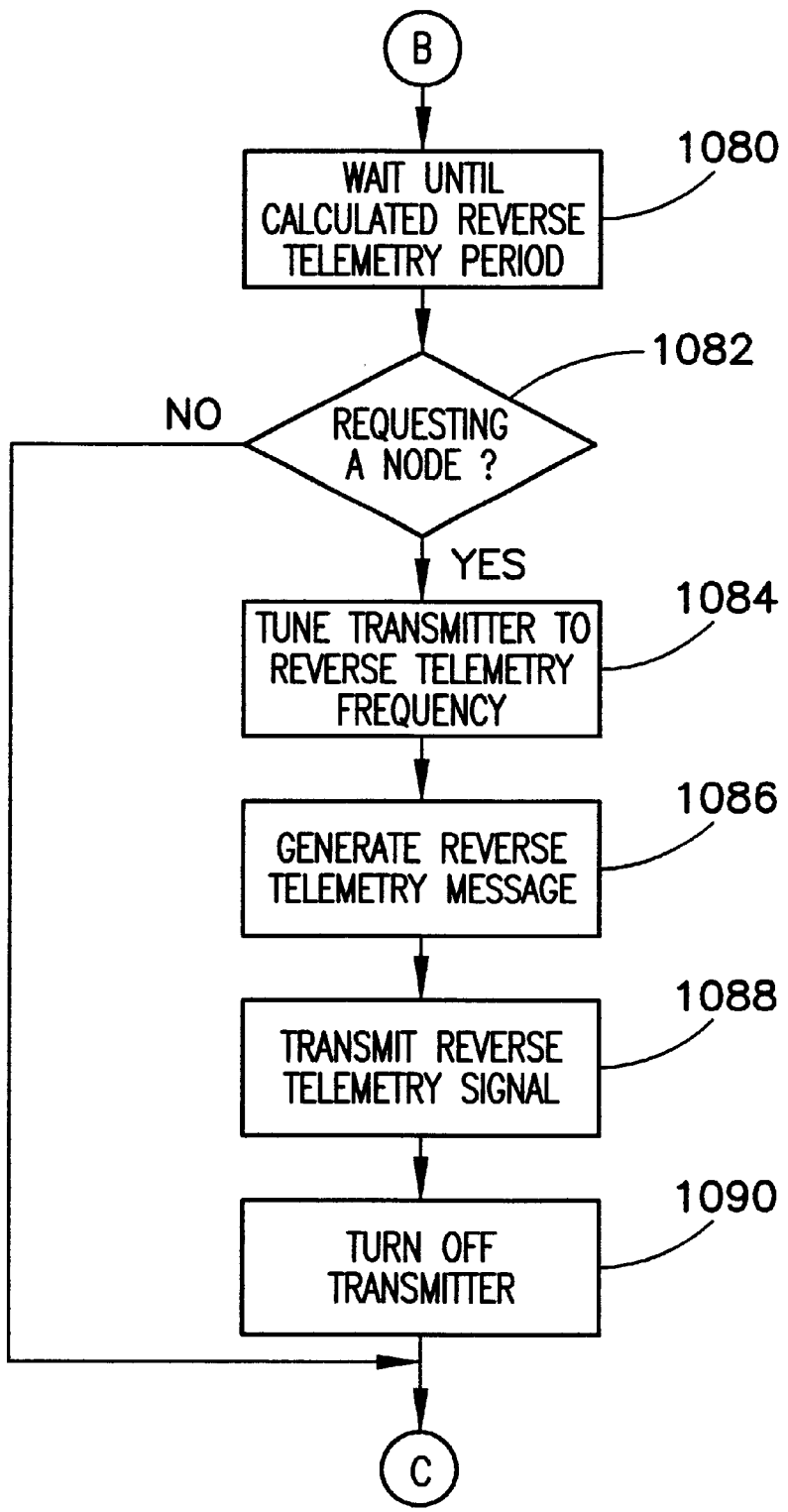

Referring now to FIGS. 10A–10C, there is shown a flowchart for a ingress testing routine 1000 which is executed by the controller 200 of the field client $50_X$. By executing the routine 700, the controller 200 causes the field client $50_X$ to implement the general operation of FIG. 6. In particular, FIG. 10A illustrates steps for implementing the wait for request input step 602 and the forward telemetry cycle step 604, FIG. 7B illustrates steps for implementing the synchronization/acknowledgment cycle step 606, and FIG. 10C illustrates steps for implementing the request telemetry cycle step 608. As illustrated in FIG. 10A, the controller 200 in step 1002 causes the field client $50_X$ to wait for a technician to select an ingress testing node and to enter a corresponding node identifier N_ID. In particular, the controller 200 is operable to receive via the keypad 209 a node identifier N_ID which identifies a node $32_Y$ to be tested. The controller 200 in step 1004 validates and stores the received input information. In particular, in the exemplary of embodiment, the node identifier N_ID is limited to an integer ranging from 1 to 17.

Then, the controller 200 in step 1006 causes the receiver 204 to tune to the forward telemetry frequency TEL_FOR which is preset in the ingress modem 60 and the field clients $50_1$ and $50_2$. The controller 200 transmits control signals to the first oscillator controller 240, the second oscillator controller 244, and the third oscillator controller 248 that cause the receiver 204 to shift the forward telemetry frequency portion of the RF signal received by the RF jack 272 to the third IF frequency of 10.7 MHz. After the receiver 204 settles to the forward telemetry frequency TEL_FOR, the controller 200 in step 1008 sets a timer for 20 seconds. Then, in step 1010 the controller 200 performs an automatic gain control loop in order to provide the third IF signal to the FM demodulator 207 at an amplitude level desired by the FM demodulator 107. In particular, the controller 200 continually adjusts the programmable gain amplifier 275 for 3 msec based upon signal level values received from the analog to digital converter 206.

After performing the automatic gain control loop, the controller 200 in step 1012 is determines whether the signal level of the third IF signal is greater than a carrier present level (e.g. −14 dBmV). If not, the controller 100 in step 1014 determines whether the 20 second timer has expired. If the 20 second timer has not expired, then controller 200 return to step 1010 in order to perform another automatic gain control loop. However, if the 20 second timer has expired, then the controller 200 assumes that no forward telemetry messages are being received. Accordingly, the controller 200 in step 1016 causes an error message to be displayed upon display 210 and then terminates the ingress test.

After the controller 200 determines that the signal level of the third IF signal is greater than the carrier level present level, the controller 200 in step 1018 determines whether the forward telemetry message extracted by the FM demodulator 207 and the Manchester decoder 208 is valid. In particular, the manchester decoder 208 provides the controller 200 with a serial bit stream of the extracted forward telemetry message and appended CRC value. Each forward telemetry message has a CRC value that is appended to the forward telemetry message when transmitted by the ingress modem 60. The controller 200 determines in a known manner from the CRC value and the extracted forward telemetry message whether the forward telemetry message is valid. If the forward telemetry message is invalid, then the controller 200 discards the extracted forward telemetry message and proceeds to step 1016 in order to display an error message upon the display 210. However, if the extracted forward telemetry message is valid, then the controller 200 in step 1020 stores the extracted forward telemetry message in its memory.

Referring now to FIG. 10B, the controller 200 in step 1030 obtains the reverse telemetry frequency TEL_REV from the forward telemetry message and tunes the transmitter 202 to the reverse telemetry frequency TEL_REV. In particular, the controller 200 transmits control signals to the first oscillator controller 240, the second oscillator controller 244, and the fourth oscillator controller 252 which cause the transmitter 202 to generate a reverse telemetry carrier that has a frequency equal to the reverse telemetry frequency TEL_REV. While the VCOs of the transmitter 202 settle, the controller 200 in step 1032 parses the stored forward telemetry message in order to determine whether the user time slot section 706 of the forward telemetry message contains its client identifier $C\_ID_X$. If the user time slot section 706 does not contain its client identifier $C\_ID_X$, then the controller 200 proceeds to step 1034; otherwise, the controller proceeds to step 1056.

In step 1034, the controller 200 determines when the next reverse telemetry signal period will occur. In particular, the controller 200 uses the following equation in order to determine when the next reverse telemetry signal will occur:

$$t_{total} = users*(20 \text{ msec} + users*4 \text{ msec}) + (nodes*24.1 \text{ msec}) + [nodes*(pnts-1)*6.1 \text{ msec}]$$

where users is equal to the number of client identifiers C_ID (i.e. field clients) listed in the user time slot section 706, nodes is equal to the unique node number UN_# listed in the user time slot section 706, and pnts is equal to the point number PT_# (i.e. the number of frequency points to be tested) listed in the user time slot section 706. The above equation takes into account practical limitations of the various devices in the embodiment described herein. For example, 20 milliseconds is allotted for each field client to allow for setting time for the oscillators in each field client. Similarly, 24.1 milliseconds is allotted for the test point switch 64 to settle when switching between nodes. Such times will necessarily vary depending on the actual devices used in the implementation. Those of ordinary skill in the art may readily modify the above equation to suit the components employed in their particular implementation.

Then in step 1036, the controller 200 determines whether the field client 50$_X$ was expecting the user time slot section 706 of the extracted forward telemetry message to contain its client identifier $C\_ID_X$. If not, then the controller 200 proceeds to step 1080 of FIG. 10C in order to wait for the next reverse telemetry signal period. However, if the controller 200 determines that the field client 50$_X$ was expecting the user time slot section 706 to contain its client identifier $C\_ID_X$, then the controller 200 proceeds to step 1038. In step 1038, the controller 200 obtains the new request level LVL_NEW from the user time slot section 706 and determines whether the new request level LVL_NEW is greater than a minimum request level (e.g. −15 dBmV). If the level of new request value LVL_NEW is not greater than the minimum request level, then the controller 200 proceeds to step 1040 in order to generate an appropriate error message. Specifically, the controller 200 in step 1040 causes a low level error to be displayed upon display 210 which indicates that the field client 50$_X$ needs to increase the level of its reverse telemetry signal.

If the controller 200 in step 1038 determines that the new request level LVL_NEW is greater than the minimum request level, then the controller proceeds to step 1042. In step 1042, the controller 200 determines whether the field client 50$_X$ has failed to transmit a reverse telemetry message more than an attempt threshold ATT_THR amount of times (e.g. 3). If more attempts to transmit a reverse telemetry have been made than the attempt threshold ATT_THR, then the controller 200 proceeds to step 1044 in order to generate an error message. Specifically, the controller 200 in step 1044 causes a collision error message to be displayed upon the display 210 and proceeds to step 1080 of FIG 10C. The collision error message basically informs the technician that the field client 50$_X$ has been unsuccessful in sending the ingress modem 60 a reverse telemetry message due to its reverse telemetry signal colliding with reverse telemetry signals of other field clients. However, if more unsuccessful attempts than the attempt threshold ATT_THR have not occurred, then the controller 200 in step 1046 determines when the field client 50$_X$ should reattempt to send its reverse telemetry message. Specifically, the controller 200 randomly sets a wait cycle value WAIT to an integer between 0 and 4. In essence, the wait cycle value causes the field client 50$_X$ to receive X forward telemetry messages before attempting to transmit a reverse telemetry signal, where X is equal to the wait cycle value WAIT. After setting the wait cycle value WAIT, the controller 200 proceeds to step 1080 of FIG. 10C.

If the user time slot section 706 does contain the field client's client identifier $C\_ID_X$, then the controller 200 in step 1056 extracts from the forward telemetry message, the measurement values for its requested node 32$_Y$. Then, in step 1058 the controller 200 displays indicia of the measurement values. For example, the controller 200 may graphically display the measurement values or display the measurement values in a table form. The controller 200 then in step 1060 calculates when the field client 50$_X$ should transmit a synchronization/acknowledgment pulse. Specifically, the controller 200 parses the extracted forward telemetry message to obtain the time slot TS$_X$ that the ingress modem 60 has allocated to the field client 50$_X$. From the obtained time slot TS$_X$, the field client 50$_X$ calculates the number of internal clock cycles to wait before transmitting the synchronization/acknowledgment pulse. Then, in step 1062 the controller 200 tunes the transmitter 202 to the reverse telemetry frequency TEL_REV, and in step 1064 the controller 200 waits until its allocated time slot TS$_X$. Once the allocated time slot TS$_X$ occurs, the controller 200 in step 1066 transmits a synchronization/acknowledgment pulse by closing the RF switch 258 for 4 msec and then opening the RF switch 258. Then, the controller 200 in step 1068 determines when the next reverse telemetry signal period will occur. In particular, the controller 200 uses the following equation in order to determine when the reverse telemetry signal period will occur:

$$t_{total} = users*(20 \text{ msec} + users*4 \text{ msec}) + (nodes*24.1 \text{ msec}) + [nodes*(pnts-1)*6.1 \text{ msec}]$$

where users is equal to the number of client identifiers C_ID listed in the user time slot section 706, nodes is equal to the unique node number UN_# listed in the user time slot section 706, and pnts is equal to the point number PT_# listed in the user time slot section 706.

Now referring to FIG. 10C, thee controller 200 in step 1080 waits until the reverse telemetry signal period. Then, in step 1082 the controller 200 determines whether the field client $50_X$ is to request a node. Specifically, the controller 200 determines whether the field client $50_X$ has received a request from the keypad 209 to perform ingress testing on a node 32P. If the controller 200 determines that the field client $50_X$ is not requesting a new node, then the controller 200 returns to step 1006 in order to process another forward telemetry signal. However, if the controller 200 determines that the field client $50_X$ is requesting a new node $32_P$, then the controller 200 tunes the transmitter 202 to the reverse telemetry frequency TEL_REV obtained from the extracted forward telemetry message. In particular, the controller 200 transmits control signals to the first oscillator controller 240, the second oscillator controller 244, and the fourth oscillator controller 252 which cause the transmitter 202 to generate a reverse telemetry carrier that has a frequency equal to the reverse telemetry frequency TEL_REV. While the VCOs of the transmitter 202 settle, the controller 200 generates a reverse telemetry message. In the exemplary embodiment, the controller 200 generates in step 1086 a reverse telemetry message which is in accord with the forward telemetry message of FIG. 8.

After the VCOs of the transmitter 202 settle, the controller 200 causes the transmitter 202 to transmit a reverse telemetry signal which includes the generated reverse telemetry message modulated upon the reverse telemetry carrier. In particular, the controller 200 sends a serial stream of data that represents the reverse telemetry message to the manchester encoder 201. The manchester encoder 201 in turn provides the transmitter 202 with an analog signal representation of the reverse telemetry message, and the transmitter 202 generates and transmits the reverse telemetry signal which includes the reverse telemetry message modulated upon the reverse telemetry carrier. Then, the controller in step 1090 turns the transmitter off and returns to step 1006 in order to process another forward telemetry signal.

While the invention has been illustrated and described in detail in the drawings and foregoing description, such illustration and description is to be considered as exemplary and not restrictive in character, it being understood that only an exemplary embodiment has been shown and described and that all changes and modifications that come within the spirit of the invention are desired to be protected. For example, while the invention has been described with the channel plan being set at the headend facility, the routines executed by the controllers 100 and 200 may be modified to enable setting of the channel plan by the field clients $50_1$ and $50_2$. Furthermore, the routines may be modified to enable each field client $50_X$ to use a different channel plan. Both of these changes would require information concerning the channel plan to be added to the reverse telemetry message and information concerning the channel plan used for each reverse spectrum measurement to be included in the forward telemetry message.

Moreover, it will be appreciated that it would be advantageous in some implementations to incorporate the test point switch 67 with the ingress modem 60 into a single component. By "single component" it is meant that the test point switch 67 and ingress modem 60 would be housed together, and would possibly share control and power supply circuitry where applicable. Such an implementation would reduce the coupling components between the two devices, thereby reducing cost and potentially interference or loss from such coupling components. In addition, such an implementation could result in reduced cost if redundant power supply and control circuitry is eliminated.

What is claimed is:

1. A method of testing a CATV system having a headend facility that is coupled to a CATV distribution network that includes a plurality of nodes through which upstream signals are transmitted to the headend facility, comprising the steps of:
    a) receiving at said headend facility a first reverse telemetry signal transmitted by a first field client that is coupled to said CATV distribution network at a first location downstream from said headend facility;
    b) selecting at said headend facility a first test node from said plurality of nodes of said CATV distribution network based upon said first reverse telemetry signal;
    c) measuring first upstream signals from said first test node to obtain a first plurality of measurement values for said first upstream signals; and
    d) transmitting from said headend facility via said CATV distribution network, a forward telemetry signal that includes said first plurality of measurement values.

2. The method of claim 1 further comprising the steps of:
    e) receiving at said first field client said forward telemetry signal that includes said first plurality of measurement values; and
    f) displaying at said first field client, indicia of said first plurality of measurement values.

3. The method of claim 1 wherein step c) further comprises obtaining from said first upstream signals a separate measurement value for each frequency of a plurality of frequencies in order to obtain said first plurality of measurement values.

4. The method of claim 1 wherein step c) further comprises:
    tuning to a first frequency and measuring a first frequency component of said first upstream signals to obtain a first measurement value of said first plurality of measurement values; and
    tuning to a second frequency and measuring a second frequency component of said first upstream signals to obtain a second measurement value of said first plurality of measurement values.

5. The method of claim 1 further comprising the steps of:
    e) receiving at said headend facility a second reverse telemetry signal transmitted by a second field client that is coupled to said CATV distribution network at a second location downstream from said headend facility;
    f) selecting at said headend facility a second test node from said plurality of nodes based upon said second reverse telemetry signal; and
    g) measuring second upstream signals from said second test node to obtain a second plurality of measurement values for said second upstream signals;
wherein said step d) further comprises transmitting from said headend facility via said CATV distribution network said forward telemetry signal wherein said forward telemetry signal further includes said second plurality of measurement values.

6. The method of claim 5 further comprising the steps of:
    h) receiving at said second field client said forward telemetry signal that includes said first plurality of measurement values and said second plurality of measurement values;
    i) determining at said second field client that said second plurality of measurement values are for the second test node; and j) displaying at said second field client indicia of said second plurality of measurement values.

7. The method of claim 1, wherein:

step a) further comprises receiving at said headend facility said first reverse telemetry signal wherein said first reverse telemetry, signal further includes a channel plan; and step c) further comprises obtaining from said upstream signals a separate measurement value for each frequency of a plurality of frequencies in order to obtain said first plurality of measurement values, wherein said plurality of frequencies corresponds to said channel plan.

8. A method of testing a CATV system having a headend facility that is coupled to a CATV distribution network that includes a plurality of nodes through which upstream signals are transmitted to the headend facility, comprising the steps of:

a) receiving at said headend facility a first reverse telemetry signal from a first field client that is coupled to said CATV distribution network at a first location downstream from said headend facility, wherein said first reverse telemetry signal includes a first node identifier;

b) receiving at said headend facility a second reverse telemetry signal from a second field client that is coupled to said CATV distribution network at a second location downstream from said headend facility, wherein said second reverse telemetry signal includes a second node identifier;

c) obtaining at said headend facility a first plurality of measurement values for first upstream signals received from a first test node selected based upon said first node identifier of said first reverse telemetry signal;

d) obtaining at said headend facility a second plurality of measurement values for second upstream signals received from a second test node selected based upon said second node identifier of said second reverse telemetry signal; and e) transmitting from said headend facility to said first field client and said second field client via said CATV distribution network a forward telemetry signal that includes (i) said first plurality of measurement values, (ii) said first node identifier which associates said first plurality of measurement values with said first test node, (iii) said second plurality of measurement values, and (iv) said second node identifier which associates said second plurality of measurement values with said second test node.

9. The method of claim 8 wherein step c) further comprises obtaining from said first upstream signals a separate measurement value for each frequency of a plurality of frequencies in order to obtain said first plurality of measurement values.

10. The method of claim 8 wherein step c) further comprises:

tuning to a first frequency and measuring a first frequency component of said first upstream signals to obtain a first measurement value of said first plurality of measurement values; and tuning to a second frequency and measuring a second frequency component of said first upstream signals to obtain a second measurement value of said first plurality of measurement values.

11. The method of claim 8 further comprising the steps of:

f) receiving at said first field client said forward telemetry signal;

g) determining at said first field client and from said first node identifier of said forward telemetry signal that said first plurality of measurement values are associated with said first test node; and h) displaying at said first field client indicia of said first plurality of measurement values.

12. The method of claim 8 wherein:

step a) further comprises receiving at said headend facility said first reverse telemetry signal wherein said first reverse telemetry signal further includes a channel plan; and step c) further comprises obtaining from said first upstream signals a separate measurement for each of a plurality of frequencies in order to obtain said first plurality of measurement values, wherein said plurality of frequencies corresponds to said channel plan.

13. A method of testing a CATV system having a headend facility coupled to a CATV distribution network that includes a plurality of nodes through which upstream signals are transmitted to the headend facility, the method comprising:

a) receiving at said headend facility a reverse RF signal which includes (i) a first reverse telemetry signal from a first field client, and (ii) a second reverse telemetry signal from a second field client, wherein said first reverse telemetry signal is modulated upon a first carrier having a reverse telemetry frequency and said second telemetry signal is modulated upon a second carrier having said reverse telemetry frequency;

b) obtaining at said headend facility a signal level measurement of a frequency component of said reverse RF signal which corresponds to said reverse telemetry frequency;

c) transmitting from said headend facility to said first field client and said second field client via said CATV distribution network, a first forward telemetry signal that includes said signal level measurement of said reverse RF signal; and d) determining at said first field client and from said signal level measurement included in said first forward telemetry signal that a reverse telemetry collision has occurred.

14. The method of claim 13 further comprising the step of:

e) re-transmitting said first reverse telemetry signal as a third reverse telemetry signal from said first field client to said headend facility in response to determining that said reverse telemetry collision occurred.

15. The method of claim 13 further comprising the step of:

e) re-transmitting said first reverse telemetry signal from said first field client to said headend facility after a period of time from determining that said reverse telemetry collision occurred.

16. The method of claim 14 further comprising the steps of:

f) receiving at said headend facility said third reverse telemetry signal;

g) selecting a first test node from said plurality of nodes based upon said third reverse telemetry signal;

h) measuring at said headend facility first upstream signals received from said first test node to obtain a first plurality of measurement values for said first upstream signals;

i) transmitting from said headend facility to said first field client and said second field client a second forward telemetry signal that includes said first plurality of measurement values;

j) receiving at said first field client said second forward telemetry signal that includes said first plurality of measurement values; and k) displaying at said first field client indicia of said first plurality of measurement values in response to receiving at said first field client said second forward telemetry signal.

17. The method of claim 16, wherein step h) further comprises obtaining from said first upstream signals a separate measurement value for each frequency of a plurality of frequencies in order to obtain said first plurality of measurement values.

18. The method of claim 17 wherein:

step a) further comprises receiving from said first field client said third reverse telemetry signal wherein said third reverse telemetry signal further includes a first node identifier;

step i) further comprises transmitting from said headend facility to said first field client and said second field client said second forward telemetry signal, wherein said second forward telemetry signal further includes said first node identifier which associates said first plurality of measurement values of said forward telemetry signal with said first test node;

step j) further comprises receiving at said first field client said second forward telemetry signal including said first node identifier; and step k) further comprises determining at said first field client and from said first node identifier of said forward telemetry signal that said first plurality of measurement values are associated with said first test node.

19. An ingress modem for testing a CATV system that includes (i) a CATV distribution network having a plurality of nodes through which upstream signals are transmitted, and (ii) a test point switch coupled to said plurality of nodes, said ingress modem comprising:

an RF output jack operable to couple to said CATV distribution network;

an RF input jack operable to couple to said test point switch;

a communication line coupled to said test point switch;

an RF receiver coupled to said RF input jack and operable to (i) receive from said RF input jack a first reverse telemetry signal transmitted by a first field client coupled to said CATV distribution network at a first location, said first reverse telemetry signal including a first node identifier that identifies a first test node of said plurality of nodes, and (ii) measure first upstream signals received from said first test node to obtain a first plurality of measurement values for said first upstream signals;

an RF transmitter coupled to said RF output jack and operable to transmit to said first field client via said CATV distribution network, a forward telemetry signal that includes said first plurality of measurement values for said first upstream signals; and a controller coupled to said RF receiver, said RF transmitter, and said communication line, wherein said controller is operable to i) control operation of said RF receiver and said RF transmitter, ii) receive said first node identifier of said first reverse telemetry signal from said RF receiver, and iii) transmit to said test point switch via said communication line, a first control signal that is indicative of said first node identifier in order to cause said test point switch to provide said RF receiver with said first upstream signals.

20. The ingress modem of claim 19 wherein said RF receiver is further operable to obtain from said first upstream signals a separate measurement value for each frequency of a plurality of frequencies in order to obtain said first plurality of measurement values.

21. The ingress modem of claim 19 wherein said RF receiver is further operable to:

i) tune to a first frequency and measure a first frequency component of said first upstream signals to obtain a first measurement value of said first plurality of measurement values; and ii) tune to a second frequency and measure a second frequency component of said first upstream signals to obtain a second measurement value of said first plurality of measurement values.

22. The ingress modem of claim 19 wherein:

said RF receiver is further operable to (i) receive a second reverse telemetry signal transmitted by a second field client coupled to said CATV distribution network, wherein said second reverse telemetry signal includes a second node identifier that identifies a second test node of said plurality of nodes, and (ii) measure second upstream signals received from said second test node to obtain a second plurality of measurement values for said second upstream signals;

said RF transmitter is further operable to transmit to said second field client via said CATV distribution network, said forward telemetry signal that further includes said second plurality of measurement values and said second node identifier which associates said second plurality of measurement values with said second test node; and said controller is further operable to (i) receive said second node identifier of said second telemetry signal from said RF receiver, and (ii) transmit to said test point switch via said communication port, a second control signal that is indicative of said second node identifier in order to cause said test point switch to provide said RF receiver with said second upstream signals.

23. The ingress modem of 19 wherein:

said RF receiver is further operable to (i) receive a channel plan that is included in said first reverse telemetry signal; and (ii) provide said controller with said channel plan; and said controller is further operable to cause said RF receiver to obtain a separate measurement value for each frequency of a plurality of frequencies in order to measure said first upstream signals, wherein said plurality of frequencies corresponds to said channel plan.

24. The ingress modem of claim 19 further comprising said test point switch.

25. A CATV system having a reverse path testing capability, the system comprising:

a CATV distribution network comprising a plurality of nodes through which upstream signals are transmitted to said headend facility;

a test point switch coupled to said plurality nodes and operable to electrically couple a first test node of said plurality of nodes to said RF receiver in response to a first control signal that is indicative of a first node identifier being provided to a node selection input of said test point switch;

a first field client coupled to said CATV distribution network at a first location downstream from said headend facility, wherein said first field client is operable to transmit a first reverse telemetry signal that includes said first node identifier that identifies said first test node of said plurality of nodes;

a RF receiver coupled to said test point switch and operable to (i) receive from said test point switch, a reverse RF signal that includes said first reverse telemetry signal, and (ii) measure first upstream signals received from said first test node to obtain a first plurality of measurement values for said first upstream signals;

a RF transmitter coupled to the CATV distribution network and operable to transmit to said first field client via said CATV distribution network a forward telemetry signal that includes said first plurality of measurement values for said first upstream signals; and a controller coupled to said RF receiver, said RF transmitter, and said test point switch and operable to (i) control operation of said RF receiver and said RF transmitter, and (ii) cause said test point switch to electrically couple said first test node to said RF receiver by providing said first control signal to said node selection input.

26. The CATV system of claim 25 wherein said RF receiver is further operable to obtain from said first upstream signals a separate measurement value for each frequency of a plurality of frequencies in order to obtain said first plurality of measurement values.

27. The CATV system of claim 25 wherein said RF receiver is further operable to:
  i) tune to a first frequency and measure a first frequency component of said first upstream signals to obtain a first measurement value of said first plurality of measurement values; and
  ii) tune to a second frequency and measure a second frequency component of said first upstream signals to obtain a second measurement value of said first plurality of measurement values.

28. The CATV system of claim 25 further comprising a second field client coupled to said CATV distribution network at a second location downstream from said headend facility, and wherein:
  said second field client is operable to transmit a second reverse telemetry signal that includes a second node identifier that identifies a second test node of said plurality of nodes;
  said RF receiver is further operable to (i) receive from said test point switch said second reverse telemetry signal as part of said reverse RF signal, and (ii) measure second upstream signals received from said second test node to obtain a second plurality of measurement values for said second upstream signals;
  said test point switch is further operable to electrically couple said second test node to said node output in response to a second control signal indicative of said second node identifier being provided to said node selection input;
  said RF transmitter is further operable to transmit via said CATV distribution network, said forward telemetry signal, wherein said forward telemetry signal further includes (i) said second plurality of measurement values for said second upstream signals and (ii) said second node identifier which associates said second plurality of measurement values with said second test node; and
  said controller is further operable to cause said test point switch to electrically couple said second test node to said RF receiver by providing said second control signal to said node selection input.

29. The CATV system of claim 28 wherein said second field client is further operable to:
  i) receive said forward telemetry signal that includes said first plurality of measurement values, said second plurality of measurement values, and said second node identifier;
  ii) determine from said second node identifier of said forward telemetry signal that said second plurality of measurement values are associated with said second test node; and
  iii) display indicia of said second plurality of measurement values in response to determining that said second plurality of measurement values are associated with said second test node.

30. The CATV system of claim 25 wherein:
  said first field client is further operable to transmit a channel plan that is included within said first reverse telemetry signal;
  said RF receiver is further operable to (i) receive said first reverse telemetry signal including said channel plan, and (ii) provide said channel plan to said controller; and
  said controller is further operable to cause said RF receiver to obtain from said upstream signals a separate measurement value for each frequency of a plurality of frequencies, in order to obtain first plurality of measurement values, wherein said plurality of frequencies corresponds to said channel plan.

31. A CATV system having a reverse path testing capability, the system comprising:
  a CATV distribution network comprising a plurality of nodes through which upstream signals are transmitted;
  a first field client coupled to said CATV distribution network at a first location, wherein said first field client is operable to transmit a first reverse telemetry signal that is modulated upon a first carrier having a reverse telemetry frequency;
  a second field client coupled to said CATV distribution network at a second location, wherein said second field client is operable to transmit a second reverse telemetry signal that is modulated upon a second carrier having said reverse telemetry frequency;
  an RF receiver coupled to said test point switch and operable to (i) receive from said test point switch an RF signal that includes said first reverse telemetry signal and said second reverse telemetry signal, and (ii) obtain a signal level measurement of said reverse RF signal at said reverse telemetry frequency;
  an RF transmitter coupled to the CATV distribution network and operable to transmit a first forward telemetry signal to said first field client and said second field client via said CATV distribution network, said first forward telemetry signal including said signal level measurement of said reverse RF signal;
  and wherein said first field client is further operable to receive said first forward telemetry signal and determine from the signal level measurement included in said first forward telemetry signal that a reverse telemetry collision has occurred.

32. The CATV system of claim 31 wherein said first field client is further operable to re-transmit said first reverse telemetry signal as a third telemetry signal in response to determining that a reverse telemetry collision occurred.

33. The CATV system of claim 31 wherein said first field client is further operable to re-transmit said first reverse telemetry signal after a period of time has expired from determining that a reverse telemetry collision occurred.

34. The CATV system of claim 32 further comprising:

a test point switch coupled to said plurality nodes;

a controller coupled to said RF receiver and said RF transmitter for controlling said RF receiver and said RF transmitter; and wherein said test point switch is operable to electrically couple a first test node of said plurality of nodes to said RF receiver in response to a first control signal that is indicative of a first node identifier being provided to a node selection input of said test point switch, said RF receiver is further operable to (i) receive from said test point switch first upstream signals of said first test node, (ii) receive said third reverse telemetry signal, (iii) provide said controller with said first node identifier of said third reverse telemetry signal, and (iv) measure said first upstream signals received from said first test node to obtain a first plurality of measurement values for said first upstream signals, said RF transmitter is further operable to transmit to said first field client via said CATV distribution network a second forward telemetry signal which includes said first plurality of measurement values, said controller is further coupled to said test point switch and is further operable to cause said test point switch to electrically couple said first test node to said RF receiver by providing said first control signal indicative of said first node identifier to said node selection input, and said first field client is further operable to (i) receive said second forward telemetry signal including said first plurality of measurement values, and (ii) display indicia of said first plurality of measurement values.

35. The CATV system of claim 34 wherein said RF receiver is further operable to obtain from said first upstream signals a separate measurement value for each frequency of a plurality of frequencies in order to obtain said first plurality of measurement values.

36. The CATV system of claim 34 wherein:

said RF transmitter is further operable to transmit said first node identifier as part of said second forward telemetry signal such that said first node identifier of said second forward telemetry signal associates said first plurality of measurement values of said second forward telemetry signal with said first test node; and said first field client is further operable to (i) receive said second forward telemetry signal that further includes said first node identifier associated with said first plurality of measurement values, and (ii) determine from said first node identifier of said second forward telemetry signal that said first plurality of measurement values are associated with said first test node.

* * * * *